United States Patent
Parkinson

(10) Patent No.: US 11,089,824 B2
(45) Date of Patent: Aug. 17, 2021

(54) APPAREL ITEM WITH INTEGRATED PARACHUTE STRUCTURE

(71) Applicant: NIKE, Inc., Beaverton, OR (US)

(72) Inventor: Adam Parkinson, Portland, OR (US)

(73) Assignee: NIKE, INC., Beaverton, OR (US)

( * ) Notice: Subject to any disclaimer, the term of this patent is extended or adjusted under 35 U.S.C. 154(b) by 265 days.

(21) Appl. No.: 16/367,598

(22) Filed: Mar. 28, 2019

(65) Prior Publication Data

US 2019/0216150 A1 Jul. 18, 2019

Related U.S. Application Data

(63) Continuation of application No. 15/402,380, filed on Jan. 10, 2017, now Pat. No. 10,285,463.

(60) Provisional application No. 62/277,132, filed on Jan. 11, 2016.

(51) Int. Cl.
*A41D 1/08* (2018.01)
*A41D 13/00* (2006.01)
*A41D 27/28* (2006.01)
*B64D 10/00* (2006.01)
*B64D 19/00* (2006.01)
*B64D 17/00* (2006.01)
*A41D 13/002* (2006.01)

(52) U.S. Cl.
CPC ............ *A41D 1/08* (2013.01); *A41D 13/0015* (2013.01); *A41D 27/28* (2013.01); *B64D 10/00* (2013.01); *B64D 17/00* (2013.01); *B64D 19/00* (2013.01); *A41D 13/002* (2013.01); *A41D 2600/10* (2013.01)

(58) Field of Classification Search
CPC ...... A41D 27/28; A41D 13/0015; A41D 1/08; A41D 2600/10; A41D 13/002; B64D 19/00; B64D 10/00; A63B 69/0028
See application file for complete search history.

(56) References Cited

U.S. PATENT DOCUMENTS

| | | | | |
|---|---|---|---|---|
| 3,045,243 | A * | 7/1962 | Lash | A41D 27/28 2/1 |
| 3,296,626 | A * | 1/1967 | Ludwikowski | A41D 27/28 2/87 |
| 3,969,772 | A * | 7/1976 | Pravaz | A41D 13/02 2/79 |

(Continued)

FOREIGN PATENT DOCUMENTS

| CN | 203736818 U | 7/2014 |
|---|---|---|
| EP | 1806061 A1 | 7/2007 |
| FR | 2255025 A1 | 7/1975 |

OTHER PUBLICATIONS

European Search Report received for European Patent Application No. 20152799.1, dated Apr. 7, 2020, 2 pages.

(Continued)

*Primary Examiner* — Khaled Annis
(74) *Attorney, Agent, or Firm* — Shook, Hardy & Bacon L.L.P.

(57) ABSTRACT

Aspects herein provide for an apparel item having an integrated parachute structure and a set of intake ducts. The parachute structure is configured to transition from a first slack state to a second inflated state subsequent to air entering the set of intake ducts incident to ground locomotion of the wearer thereby increasing air resistance to wearer movement.

14 Claims, 23 Drawing Sheets

(56) References Cited

U.S. PATENT DOCUMENTS

| | | | |
|---|---|---|---|
| 4,220,299 A * | 9/1980 | Motter | B64D 10/00 2/250 |
| 4,513,451 A * | 4/1985 | Brown | A41D 27/285 2/102 |
| 4,527,794 A | 7/1985 | Dunn | |
| 4,722,099 A | 2/1988 | Kratz | |
| 4,854,572 A | 8/1989 | Knight | |
| 4,884,768 A | 12/1989 | Ansley | |
| 5,176,600 A | 1/1993 | Wilkinson | |
| 5,217,186 A | 6/1993 | Stewart et al. | |
| 5,269,862 A * | 12/1993 | Nakajima | A01G 9/1438 156/155 |
| 5,460,589 A | 10/1995 | Dunn | |
| 5,472,394 A | 12/1995 | Michaelson | |
| 5,507,042 A | 4/1996 | Van Der Sleesen | |
| 5,704,064 A | 1/1998 | Van Der Sleesen | |
| 5,722,571 A * | 3/1998 | Littlejohn | A41D 27/28 223/1 |
| 5,781,930 A | 7/1998 | Boshoff | |
| 5,834,093 A * | 11/1998 | Challis | A61F 13/023 428/136 |
| 5,873,131 A | 2/1999 | Sabin | |
| 5,890,225 A | 4/1999 | Marschall | |
| 5,960,474 A | 10/1999 | Dicker et al. | |
| 6,070,274 A * | 6/2000 | van der Sleesen | A41D 13/0156 2/456 |
| 6,085,353 A * | 7/2000 | van der Sleesen | A41D 15/04 2/108 |
| 7,856,668 B2 | 12/2010 | Demarest et al. | |
| 8,240,610 B1 | 8/2012 | Cooper | |
| 8,341,765 B2 | 1/2013 | Brodbeck | |
| 8,371,993 B2 | 2/2013 | Brown et al. | |
| 8,375,465 B2 | 2/2013 | Whaley | |
| 8,684,891 B1 | 4/2014 | Davidson | |
| 8,695,117 B1 * | 4/2014 | Machuca | A41D 13/0015 2/69 |
| 9,060,551 B2 * | 6/2015 | Nordstrom | B32B 5/04 |
| 9,700,077 B2 * | 7/2017 | Baron | A41B 1/00 |
| 2003/0140399 A1 | 7/2003 | Golde | |
| 2003/0140404 A1 * | 7/2003 | Golde | A41D 27/28 2/465 |
| 2004/0237168 A1 * | 12/2004 | Braun | A41D 27/28 2/93 |
| 2005/0172381 A1 * | 8/2005 | Bush | A41D 27/285 2/249 |
| 2005/0208266 A1 * | 9/2005 | Baron | D03D 15/0077 428/131 |
| 2005/0261113 A1 | 11/2005 | Wilkinson | |
| 2009/0077710 A1 * | 3/2009 | Bay | A41D 3/00 2/87 |
| 2010/0242151 A1 * | 9/2010 | Mather | A41D 31/06 2/115 |
| 2011/0239350 A1 * | 10/2011 | Ho | A41D 31/14 2/93 |
| 2011/0265242 A1 | 11/2011 | Lambertz | |
| 2011/0296580 A1 * | 12/2011 | Demarest | A41D 13/0015 2/69 |
| 2012/0324613 A1 * | 12/2012 | Tsang | A63B 31/12 2/2.15 |
| 2013/0117903 A1 | 5/2013 | Kanayama | |
| 2013/0198926 A1 | 8/2013 | Rod, III et al. | |
| 2013/0212767 A1 | 8/2013 | Nordstom et al. | |
| 2013/0219579 A1 * | 8/2013 | Molyneux | A41D 13/012 2/2.15 |
| 2014/0259276 A1 * | 9/2014 | Fier | A41D 1/00 2/85 |
| 2016/0242474 A1 * | 8/2016 | Baschak | A41D 31/102 |
| 2016/0338435 A1 * | 11/2016 | Aihara | A41D 27/28 |
| 2017/0071275 A1 * | 3/2017 | Darby | A41D 31/14 |
| 2017/0105466 A1 * | 4/2017 | Baschak | A41D 27/28 |
| 2017/0197107 A1 * | 7/2017 | Parkinson | A41D 13/0015 |
| 2017/0273377 A1 * | 9/2017 | Aihara | A41B 1/08 |
| 2017/0340037 A1 * | 11/2017 | Bailey | A41D 27/28 |

OTHER PUBLICATIONS

Intention to Grant received for European Patent Application No. 17702979.0, dated Jun. 3, 2020.

Office Action received for European Patent Application No. 17702979.0, dated Mar. 31, 2020, 2 pages.

Communication pursuant to Article 94(3) dated Jun. 6, 2019 in European Patent Application No. 17702979.0, 5 pages.

Extended European Search Report received for European Patent Application No. 20203628.1, dated Feb. 22, 2021, 6 pages.

* cited by examiner

APPAREL ITEM WITH INTEGRATED PARACHUTE STRUCTURE

CROSS-REFERENCE TO RELATED APPLICATIONS

This application, U.S. application Ser. No. 16/367,598, is entitled "Apparel Item with Integrated Parachute Structure" and is a Continuation Application of U.S. Non-Provisional application Ser. No. 15/402,380, entitled "Apparel Item with Integrated Parachute Structure" and filed on Jan. 10, 2017. U.S. Non-Provisional application Ser. No. 15/402,380 likewise claimed priority to U.S. Prov. App. No. 62/277,132, entitled "Apparel Item with Integrated Parachute Structure," and filed Jan. 11, 2016. The entireties of the aforementioned applications are incorporated by reference herein.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects herein are directed to an apparel item having an integrated parachute structure(s) and integrated intake ducts. In exemplary aspects, the intake ducts are configured to capture and channel air into the apparel item and into the integrated parachute structure causing the parachute structure to transition from a first slack state to a second inflated state. When inflated, the parachute structure increases air resistance to, for instance, ground locomotion of the wearer. Thus, when used as a training accessory, the apparel item described herein may cause the wearer to exert greater effort during training with improved performance benefits when competing. Moreover, the parachute structure is integrated into the apparel item in such a way as to not interfere with the wearer's cadence, gait, or form.

The apparel item as described herein may take the form of an apparel item for an upper torso of a wearer and/or an apparel item for a lower torso of a wearer. For instance, the apparel item may be formed in whole or in part from a material that is substantially impervious to air (e.g., is wind resistant). The apparel item, when in the form of a jacket or shirt, may comprise a plurality of intake ducts or slits located at least on the front and/or sides of the jacket, and/or along sleeve portions of the jacket, where the slits are in fluid communication with a space formed between the inner-facing surface of the jacket and the wearer's body. The slits may, for example, be S-shaped with a strip of material at a mid-point forming two flaps from the material of the apparel item. The flaps may be pivotal at the strip of material. The S-shaped slits may also be positioned in varying orientations on the apparel item, such that different ones of the flaps are engaged by different wind flow patterns.

The back panel of the jacket, along with the sleeve portions of the jacket, may be configured to transition from a first slack state to a second inflated state subsequent to air entering the jacket via the plurality of slits. Once inflated, the back panel and/or sleeve portions act to increase drag on the jacket and may cause the wearer to expend greater effort during running or sprinting exercises. Moreover, by forming the jacket from a material that is substantially impermeable to air, the back panel and/or sleeve portions are better able to maintain its inflated state during locomotion by the wearer (i.e., air is prevented from leaking through the back panel). When locomotion slows or ceases, air within the jacket may passively exit via the plurality of slits causing the back panel and/or the sleeve portions to transition back to the slack or un-inflated state. It is further contemplated herein, that this configuration may be embodied in the form of a pant where the plurality of slits are located over the front portion of the pant, and the back portion of the pant is configured to transition from a slack state to an inflated state upon air flowing through the plurality of slits.

The apparel items described herein (e.g., shirts, vests, jackets, pants, shorts, and sleeve portions) may be worn by themselves or in combination to provide varying levels of air resistance. For instance, the shirt, jacket, or sleeve portions described herein may be worn with the pant(s) described herein to provide an increased level of air resistance as compared to the shirt, jacket, or sleeve portions being worn without the pant(s) or the pant(s) being worn without the shirt, jacket, or sleeve portions.

BRIEF DESCRIPTION OF THE DRAWINGS

Examples of the present invention are described below with reference to the attached drawings figures, wherein.

DETAILED DESCRIPTION

Figure 1:
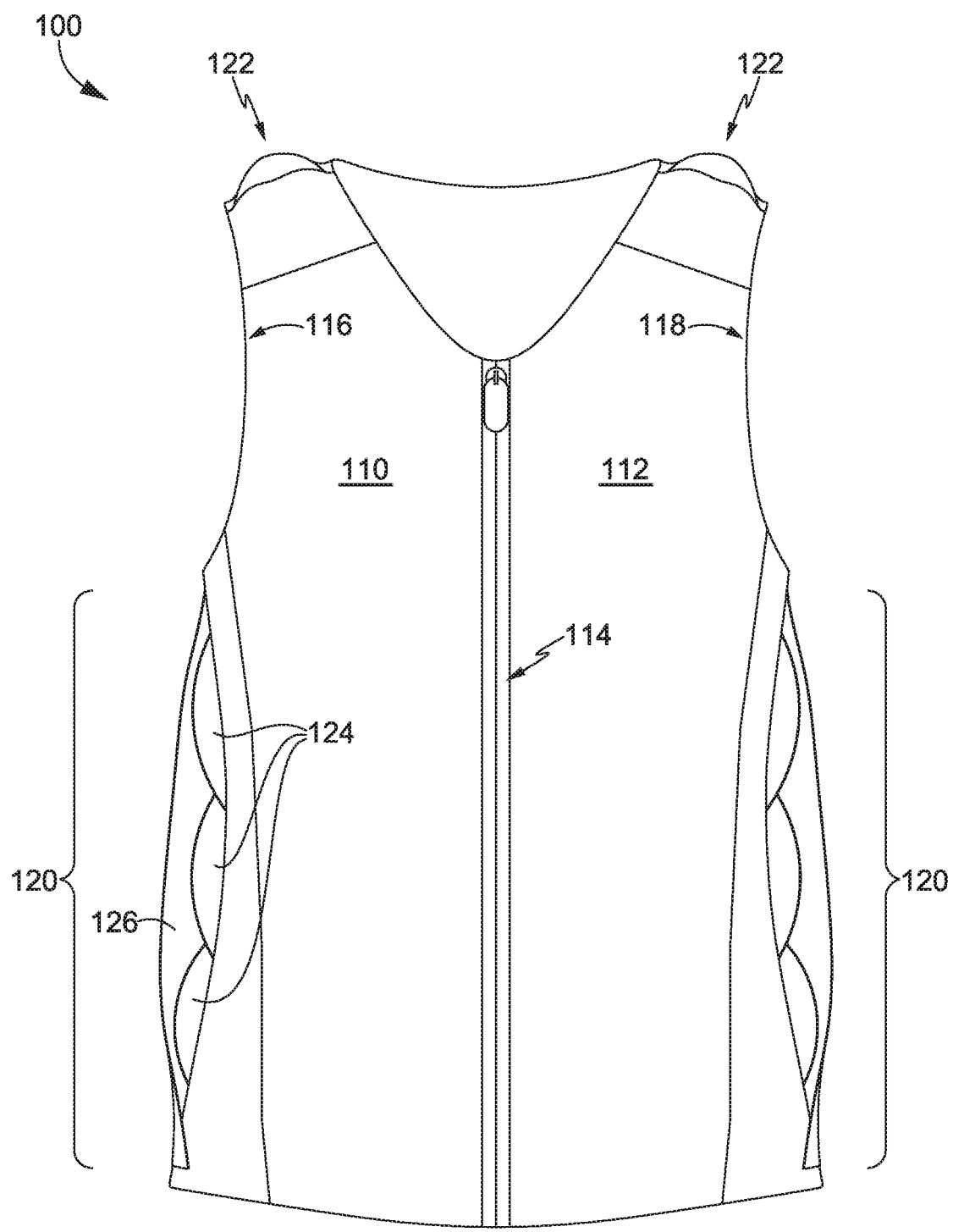
FIG. 1 illustrates a front view of an exemplary shirt having an integrated parachute structure in accordance with aspects herein.

The subject matter of the present invention is described with specificity herein to meet statutory requirements. However, the description itself is not intended to limit the scope of this disclosure. Rather, the inventors have contemplated that the disclosed or claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Aspects herein relate to an apparel item having an integrated intake duct system and an integrated parachute structure(s). The apparel item described herein may take the form of a shirt, a vest, a jacket, a pant, a short, or sleeve portions. The duct system is configured to capture and channel air into the parachute structure causing the parachute structure to transition from a first slack state to a second inflated state. When in the second inflated state, the parachute structure produces increased air resistance to wearer movement causing the wearer to expend additional effort. Thus, the apparel item described herein may be a useful training tool for athletes, causing the athletes to exert additional effort when wearing the apparel item during training sessions resulting in performance benefits when competing.

In exemplary aspects, the integrated parachute structure and the intake ducts are positioned on the apparel item so as not to interfere with the wearer's movements, cadence, or gait. For instance, the parachute structure is generally positioned on a posterior face of the apparel item, and the intake ducts are generally positioned on the side or front portions of the apparel item. In exemplary aspects, each intake duct may comprise an opening, and the opening may be oriented to face in an anterior or forward direction when the apparel item is in an as-worn configuration. Because of this positioning, ambient air that is traveling over the front of the wearer is captured by the intake ducts. The intake ducts are configured or oriented to transport the captured air in a posterior direction in order to inflate the parachute structure located on the posterior face of the apparel item. By configuring the apparel item as described, the wearer retains full movement of his or her extremities and the parachute structure is prevented from generally interfering with the wearer's movements.

As used throughout this disclosure, the term "integrated duct system" and "integrated parachute structure" may mean that the respective systems or structures are integrated into the apparel item as opposed to some traditional training parachute training systems that comprise separate elements that are removably attached to the wearer via a belt or harness system. For instance, the term "integrated" may mean that the duct system and/or the parachute structure may form one or more portions of the apparel item. As an example, it is contemplated herein that the parachute structure may form at least in part the back panel of a jacket, shirt, or pant, and/or the intake ducts may form at least in part side portions of the apparel item or even sleeve portions of the apparel item.

As further used throughout this disclosure, the term "front panel" means a panel that is adapted to cover a front area of a wearer when the apparel item is worn, and the term "back panel" means a panel that is adapted to cover a back area of a wearer when the apparel item is worn. The front panel and the back panel may, in exemplary aspects, comprise two or more separate panels, or, alternatively, the front panel and the back panel may comprise a unitary panel. Any and all aspects, and any variation thereof, are contemplated as being within the scope herein.

Continuing, the term "as-worn configuration" or "worn" means the apparel item as worn by a wearer standing in anatomical position as that term is known in the art. Further, terms such as "anterior," "posterior," "lateral," "medial," "superior," "inferior," and "mid-axillary" are meant to be given their common anatomical meanings and are used with respect to the apparel item being in the as-worn configuration. The term "fluid communication" means a generally unobstructed flow path for air or other gases. Continuing, the term "affixing" or "coupling" may comprise releasably affixing two items together via, for instance, buttons, snaps, zippers, hook-and-loop fasteners, and the like, and may also comprise permanently affixing two items together via, for example, stitching, bonding, adhesives, welding, and the like. Any and all aspects, and any variation thereof, are contemplated as being within the scope herein.

Turning now to FIG. 1, FIG. 1 illustrates a front view of an exemplary apparel item 100 having an integrated parachute structure in accordance with aspects herein. As shown, the apparel item 100 is in the form of a sleeveless vest with a zippered front. However, it is contemplated herein that the apparel item 100 may be in the form of a vest with full-length sleeves or partial sleeves, a jacket with full-length sleeves or partial sleeves, or a shirt (sleeveless, half sleeves, quarter sleeves, three-quarter sleeves, or full-length sleeves) without a zippered front. Moreover, it is contemplated herein that the apparel item 100 may comprise additional features not shown in FIG. 1 such as pockets and/or a hood. Any and all aspects, and any variation thereof, are contemplated as being within the scope herein.

As depicted in FIG. 1, the apparel item 100 comprises a first front panel 110 and a second front panel 112 that are releasably affixed to one another by a zipper-type mechanism 114. The apparel item 100 further comprises a first sleeve opening 116 and a second sleeve opening 118. The first and second front panels 110 and 112 may be formed from a woven material, a knitted material, or a combination of woven and knit materials. In exemplary aspects, the textile material may be selected for athletic wear. For instance, the textile material used to form the first and second front panels 110 and 112 may exhibit moisture-management properties (i.e., a fabric's ability to move moisture from one surface of the fabric to the opposite surface of the fabric), stretch properties, and/or varying levels of air permeability.

As shown in FIG. 1, the apparel item 100 further comprises a first set of intake ducts 120 and a second set of intake ducts 122. In exemplary aspects, the first set of intake ducts 120 are generally positioned inferior to the first sleeve opening 116 and the second sleeve opening 118. In one exemplary aspect, the first set of ducts 120 may be positioned generally along mid-axillary lines of the apparel item 100. The second set of intake ducts 122 is generally positioned at a shoulder region of the apparel item 100. For example, the second set of intake ducts 122 may be positioned superior to the first sleeve opening 116 and superior to the second sleeve opening 118 on either side of a neckline opening of the apparel item 100.

Both the first and second sets of intake ducts 120 and 122 may be formed from a material or textile that is substantially impermeable to air (e.g., is wind resistant). Exemplary materials may comprise tightly knitted or woven fabrics, fabrics treated with a waterproof membrane such as polytetrafluorethylene (PTFE), polyurethane materials, rubber materials, plastic materials, and the like. As used throughout this disclosure, the term "resistant to air" or "wind resistant," means that the material has a Cubic Feet per Minute (CFM) rating or value of 40, 30, 20, or less, where this number indicates how many cubic feet of air can pass through the material per minute.

In exemplary aspects, the materials used to form the first and second set of intake ducts 120 and 122 may also be resistant to water. For example, the materials may be treated with a durable water repellant (DWR) finish. Additionally, in exemplary aspects, the material used to form the first and second set of intake ducts 120 and 122 may comprise a lightweight or ultra-lightweight fabric so as not to appreciably increase the weight of the apparel item 100. In exemplary aspects, the material used to form the first and second sets of intake ducts 120 and 122 may have a weight between 20 $g/m^2$ (gsm) to 60 gsm, between 30 gsm to 45 gsm, or between 35 gsm and 43 gsm, although weights above and below these values are contemplated herein. Any and all aspects, and any variation thereof, are contemplated as being within the scope herein.

With respect to the first set of intake ducts 120, in exemplary aspects, the first set of intake ducts 120 may comprise multiple intake ducts as shown in FIG. 1 where each duct 120 comprises an opening that is oriented to face in an anterior or forward direction when the apparel item 100 is in an as-worn configuration. For example, with respect to the first set of intake ducts 120 located inferior to the first sleeve opening 116, the first set of intake ducts 120 may comprise an inner or more medial set of intake ducts 124, and an outer or more lateral set of intake ducts 126. The discussion regarding the medial intake ducts 124 and the lateral intake ducts 126 is equally applicable to the first set of intake ducts 120 located inferior to the second sleeve opening 118.

In exemplary aspects, the medial intake ducts 124 may comprise one intake duct or multiple intake ducts, although it is contemplated herein that the apparel item 100 may not comprise a medial set of intake ducts 124. In one aspect, and as will be explained in greater depth below, the medial intake ducts 124 may be formed by partially overlapping the panels used to form the ducts 124 such that the resulting ducts partially overlap one another. However, it is further contemplated herein, that the panels used to form the medial intake ducts 124 may not be overlapped such that each duct 124 is distinct and does not overlap an adjacent duct 124. In an optional aspect, the edges of the openings of the medial intake ducts 124 (shown en face in FIG. 1) may be reinforced with, for example, a seam tape or other type of stiffening member to help maintain the intake ducts 124 in an open, or partially open, configuration. This may be particularly useful when the medial intake ducts 124 are formed from a lightweight or ultra-lightweight material as this material has a tendency to collapse onto itself and lacks structure. Any and all aspects, and any variation thereof, are contemplated as being within the scope herein.

Figure 4:
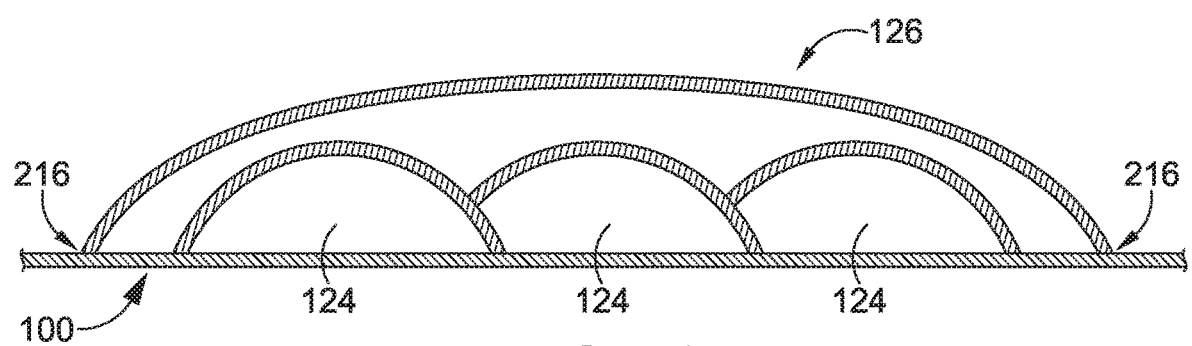
FIG. 4 illustrates a close-up view of a set of intake ducts located on side portions of the shirt of FIG. 1 in accordance with aspects herein.

Regarding the lateral set of intake ducts 126, as discussed, the lateral intake ducts 126 are positioned external or lateral to the medial intake ducts 124. In an exemplary aspect, the lateral intake ducts 126 may comprise a single intake duct with an opening that spans the openings of the medial intake ducts 124. This exemplary aspect is shown in FIG. 4 which illustrates a front plan view of the medial intake ducts 124 and the lateral intake duct 126. As shown in FIG. 4, the opening of the lateral intake duct 126 spans the openings of the medial intake ducts 124. Moreover, FIG. 4 illustrates how the medial intake ducts 124 may be formed such that they partially overlap one another.

Returning to FIG. 1, it is contemplated herein that the lateral intake ducts 126 may comprise more than a single duct. For instance, the lateral intake ducts 126 may comprise two ducts, three ducts, four ducts, or more. Moreover, it is contemplated herein, that the apparel item 100 may not comprise the lateral set of intake ducts 126, and, instead, may just comprise the medial set of intake ducts 124. Any and all aspects, and any variation thereof, are contemplated as being within the scope herein. Similar to the medial intake ducts 124, the edges of the openings of the lateral intake ducts 126 (shown en face in FIG. 1) may be reinforced with, for example, a seam tape or other type of stiffening member to help maintain the intake ducts 126 in an open, or partially open, configuration.

Figure 5:
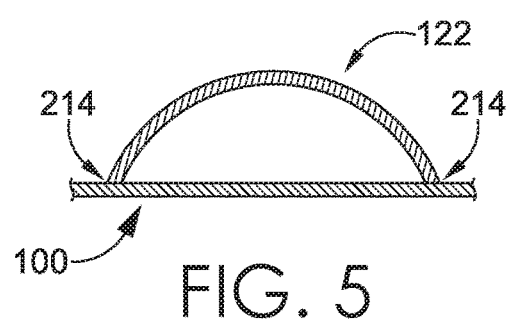
FIG. 5 illustrates a close-up view of a set of intake ducts located on shoulder portions of the shirt of FIG. 1 in accordance with aspects herein.

The apparel item 100 may optionally comprise the second set of intake ducts 122 located superior to the first and second sleeve openings 116 and 118 at a shoulder region of the apparel item 100. Although shown as a single duct opening at each shoulder region, it is contemplated herein that the second set of intake ducts 122 may comprise multiple ducts (two, three, four, and the like) at each shoulder region of the apparel item 100. Each duct of the second set of intake ducts 122 comprises an opening that is oriented to face anteriorly or forward when the apparel item 100 is worn. Similar to the first set of intake ducts 120, the openings of the second set of intake ducts 122 may be reinforced with a seam tape or other type of stiffening member to maintain the intake ducts 122 in an open or partially open state. FIG. 5 illustrates a front plan view of one of the second set of intake ducts 122.

Figure 2A:
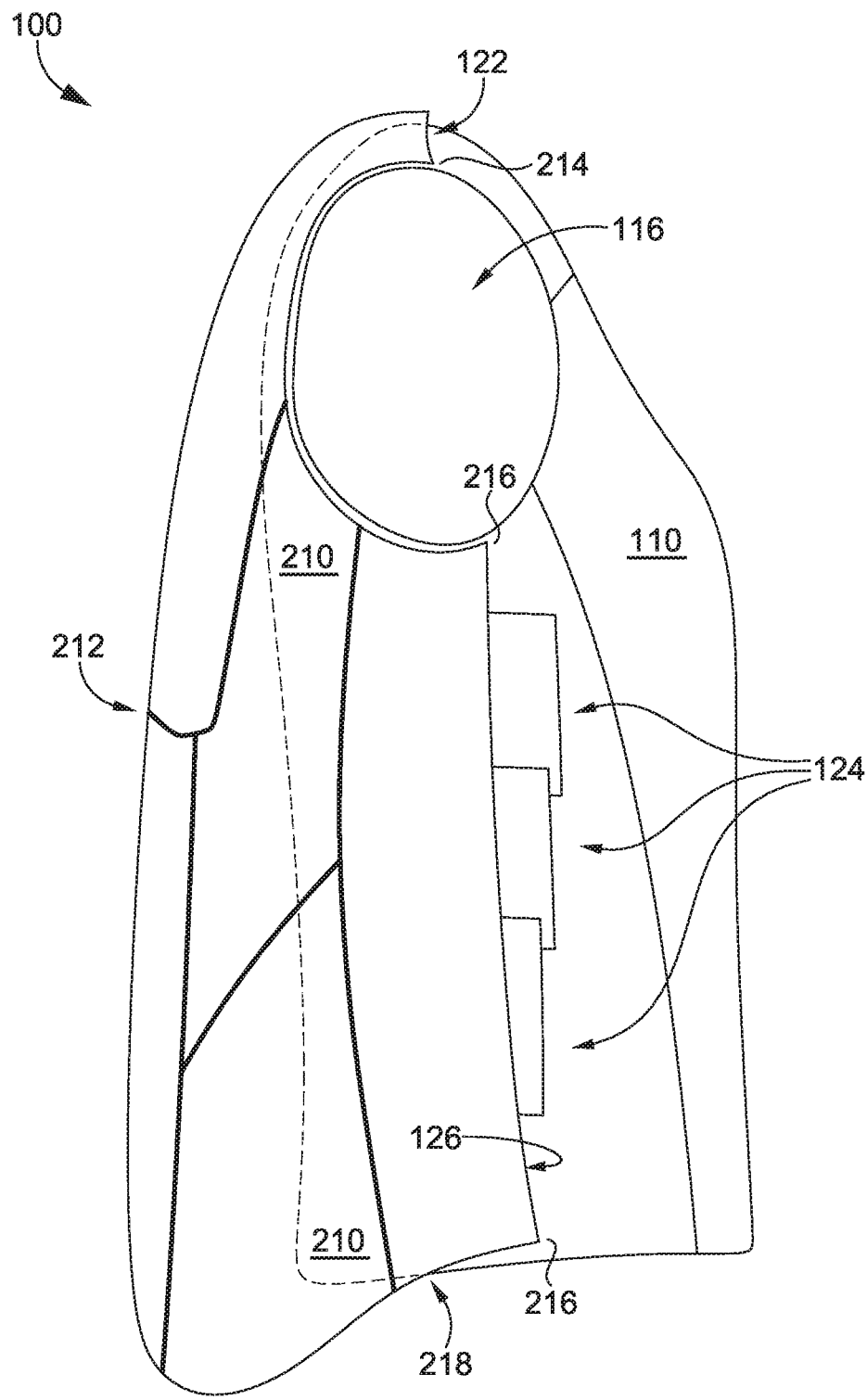
FIG. 2A illustrates a right side view of the exemplary shirt having the integrated parachute structure of FIG. 1 where the parachute structure is in a slack state in accordance with aspects herein.

Turning now to FIG. 2A, FIG. 2A depicts a right side view of the apparel item 100 when the apparel item's parachute structure 212 is in a slack state in accordance with aspects herein. A left side view of the apparel item 100 would generally disclose the same features. As shown in FIG. 2A, the apparel item 100 further comprises a back panel 210 (shown by the dashed line to indicate it is hidden from view) and a parachute structure 212 overlaying or positioned adjacent to the back panel 210. The back panel 210 may comprise a separate panel from the first and second front panels 110 and 112 and may be coupled to the first and second front panels 110 and 112 either directly or via one or more side panels, gussets, or shoulder panels. In another exemplary aspect, the back panel 210 may be integrally formed with the front panels 110 and 112 via, for instance, a knitting or weaving process. Any and all aspects, and any variation thereof, are contemplated as being within the scope herein. In either regard, the back panel 210 along with the first and second front panels 110 and 112 may help to define in whole or in part a neckline opening, the first and second sleeve openings 116 and 118, and a waist opening for the apparel item 100. The back panel 210 may be formed from a woven material, a knitted material, or a combination of woven and knit materials. In exemplary aspects, the textile material may be selected for athletic wear. For instance, the textile material used to form the back panel 210 may exhibit stretch properties, moisture-management properties, and/or varying levels of air permeability.

The parachute structure 212 comprises an oversized second back panel that overlays in whole or in part the back panel 210 and is affixed to the apparel item 100 at select locations such that a space or void is maintained between an inner-facing surface of the parachute structure 212 and an outer-facing surface of the back panel 210. As used with respect to the apparel item 100, the term "oversized" may mean that the parachute structure 212 may have a longer width (as measured from a first lateral side to a second lateral side of the parachute structure 212) than the back panel 210, and/or the parachute structure 212 may have a longer length (as measured from a superior end of the parachute structure 212 to an inferior end of the parachute structure 212) than the back panel 210. Any and all aspects, and any variation thereof, are contemplated as being within the scope herein.

The parachute structure 212, similar to the first and second sets of intake ducts 120 and 122, may be formed from a material or textile that is substantially impermeable to air. For instance, the material used to form the parachute structure 212 may have a CFM rating of 40, 30, 20, or less. Exemplary materials may comprise tightly knitted or woven fabrics, fabrics treated with a waterproof membrane such as PTFE, polyurethane materials, rubber materials, plastic materials, and the like. In exemplary aspects, the materials used to form the parachute structure 212 may also be resistant to water. For example, the materials may be treated with a durable water repellant (DWR) finish. Additionally, in exemplary aspects, the material used to form the parachute structure 212 may comprise a lightweight or ultra-lightweight fabric so as not to appreciably increase the weight of the apparel item 100. In exemplary aspects, the material used to form the parachute structure 212 may have a weight between 20 gsm to 60 gsm, between 30 gsm to 45 gsm, or between 35 gsm and 43 gsm, although weights above and below these values are contemplated herein. Any and all aspects, and any variation thereof, are contemplated as being within the scope herein.

In exemplary aspects, the parachute structure 212 may be permanently affixed to the apparel item 100 at select locations or releasably affixed to the apparel item 100 at the select locations such that the parachute structure 212 may be removed from the apparel item 100. Exemplary attachment points may comprise at the shoulder regions of the apparel item 100 (indicated by reference numeral 214), along all or part of the sleeve opening 116, along the side regions of the apparel item 100 (indicated by reference numeral 216), and/or along the bottom margin of the back panel 210 (indicated by the reference numeral 218).

In exemplary aspects, the parachute structure 212 may form all or part of the first and second set of intake ducts 120 and 122. For example, as shown in FIG. 2A, the lateral set of intake ducts 126 may be formed from and integrally extend from the parachute structure 212. More specifically, the parachute structure 212 is affixed to the apparel item 100 at the areas indicated by the reference numeral 216 and the intervening span of material between the two attachment points 216 forms the lateral set of intake ducts 126. This is also shown in FIG. 4.

Similarly, the second set of intake ducts 122 may be formed from and integrally extend from the parachute structure 212. For instance, the parachute structure 212 may be affixed to the apparel item at a first attachment point 214 corresponding to a location adjacent and superior to the first sleeve opening 116 and to a second attachment point (shown more clearly in FIG. 1) corresponding to a location adjacent to the neckline opening. The intervening span of material between the two attachment points 214 forms the second set of intake ducts 122. This aspect is also shown in FIG. 5. Thus, the lateral set of intake ducts 126 and the second set of intake ducts 122 are integrally formed from and extend from the parachute structure 212.

As described, both the lateral set of intake ducts 126 and the second set of intake ducts 122 comprise openings that are oriented to face anteriorly or forward when the apparel item 100 is worn. By orienting the openings to face anteriorly, air that is flowing over the front of the apparel item 100 may be channeled posteriorly via the openings of the lateral set of intake ducts 126 and the second set of intake ducts 122 into the space between the parachute structure 212 and the back panel 210 thereby inflating the parachute structure 212. Moreover, air that is channeled posteriorly via the openings of the lateral set of intake ducts 126 and the second set of intake ducts 122 may also be used to help cool the wearer during, for instance, physical activity.

Figure 6:
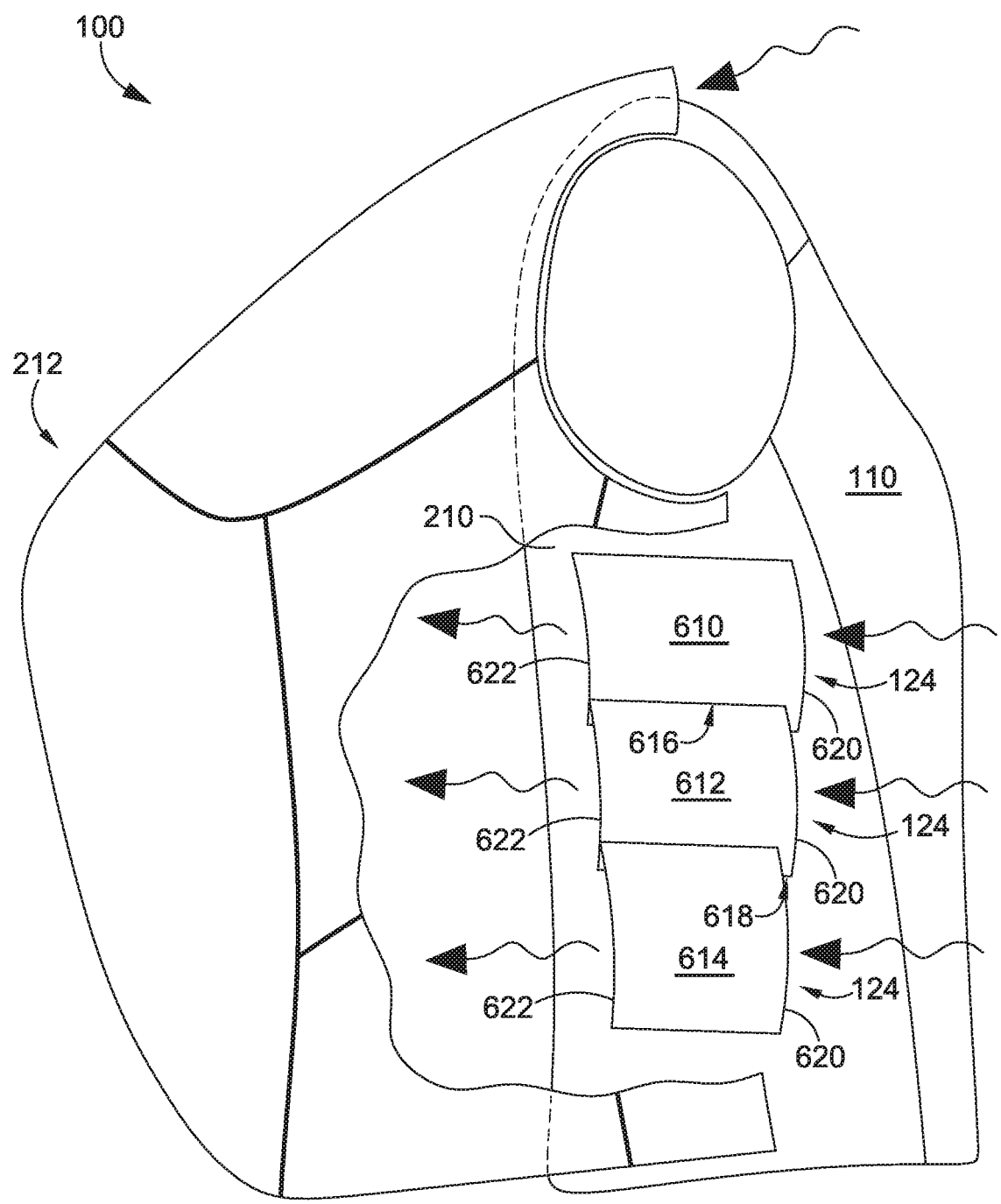
FIG. 6 illustrates a cut-away view of the set of intake ducts shown in FIG. 4 in accordance with aspects herein.

In one exemplary aspect, and as shown in FIG. 6, the medial set of intake ducts 124 may not be integrally formed from the parachute structure 212. FIG. 6 depicts a right side view of the apparel item 100 with a portion of the parachute structure 212 cut away to illustrate one exemplary aspect of how the medial intake ducts 124 are formed in accordance with aspects herein. As shown in FIG. 6, the medial intake ducts 124 may be formed from a first panel 610, a second panel 612, and a third panel 614, where the panels 610, 612, and 614 are affixed to either the front or back panels of the apparel item 100 or to each other to form the ducts 124. For instance, with respect to the first panel 610, both the superior and inferior edges of the panel 610 are affixed directly to the apparel item 100. With respect to the second panel 612, a superior edge 616 may be affixed along some or all of its length to the first panel 610 and an inferior edge 618 may be affixed directly to the front panel 110 and/or the back panel 210 of the apparel item 100. This same configuration would hold true for the third panel 614. As further shown in FIG. 6, the panels 610, 612, and 614 are oriented such that the medial intake ducts 124 may angle slightly upward from an anterior to a posterior aspect.

With continued reference to FIG. 6, the anterior and posterior edges of the first, second, and third panels 610, 612, and 614 form ingress openings 620 and also egress openings 622 respectively for each of the ducts 124. In exemplary aspects, the ingress openings 620 are located anterior to the egress openings 622 and are oriented to face in an anterior or forward direction when the apparel item 100 is worn. Further, the ingress openings 620 may be positioned such that they extend further anteriorly on the apparel item 100 as compared to the opening(s) associated with the intake ducts 126. This aspect is shown more clearly in, for instance, FIG. 2A. The egress openings 622 are oriented to face posteriorly or backward when the apparel item 100 is worn and are positioned such that the parachute structure 212 covers or overlays the egress openings 622. Thus, the egress openings 622 open into the space formed between the back panel 210 and the parachute structure 212. Air that flows into the ingress openings 620 incident to, for instance, ground locomotion by the wearer, will be discharged via the egress openings 622 into this space.

Figure 2B:
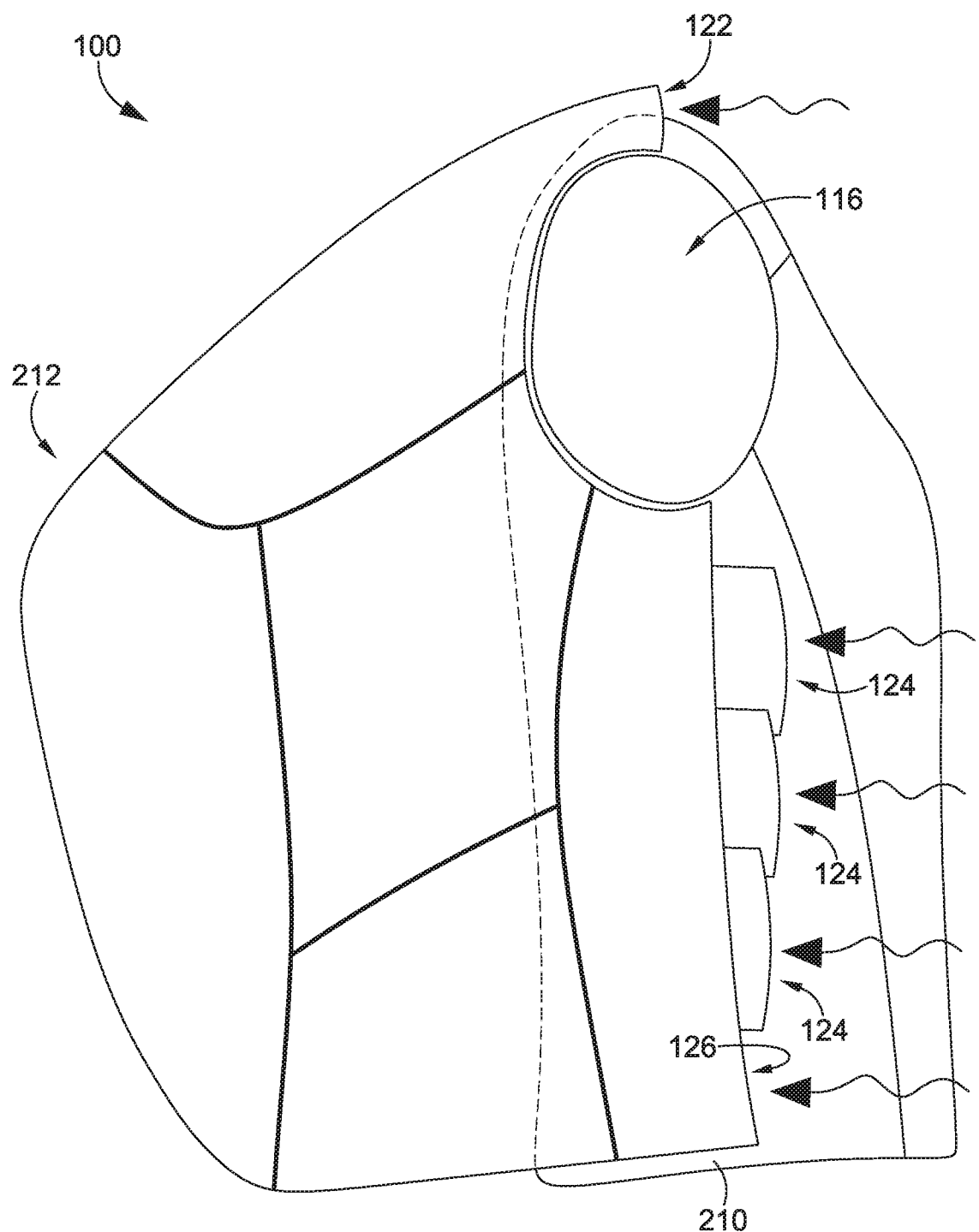
FIG. 2B illustrates a right side view of the exemplary shirt having the integrated parachute structure of FIG. 1 where the parachute structure is in an inflated state in accordance with aspects herein.

As shown in FIG. 2B, air may flow into the parachute structure 212 via the medial intake ducts 124, the lateral intake ducts 126, and/or the second set of intake ducts 122 as indicated by the arrows. By forming the parachute structure 212 and the intake ducts 122, 124, and 126 from a wind-resistant material, any air that flows into parachute structure 212 via the intake ducts 122, 124, and 126 will generally cause the parachute structure 212 to quickly transition from a slack state as shown in FIG. 2A to an inflated state as shown in FIG. 2B. In other words, by forming the intake ducts 122, 124, and 126 and the parachute structure 212 from a wind-resistant material, air that flows into the parachute structure 212 is generally retained and dissipation of the air through the material surface is greatly reduced.

As further shown in FIG. 2B, in exemplary aspects the parachute structure 212 may be shaped to extend or inflate to a greater degree at the superior portion of the parachute structure 212 as compared to the inferior portion of the parachute structure 212. To achieve this expansion pattern, the panel used to form the parachute structure 212 may be configured to be wider across the superior portion of the parachute structure 212 as compared to the inferior portion of the parachute structure 212. This expansion pattern may provide better resistance training to athletes that train with the upper portion of their body bent forward such as sprinters. Sprinters typically start off of a starting block with the upper portion of their bodies bent forward and gradually transition to an upright position during the sprint. Thus, when the sprinter is bent forward, the superior portion of the parachute structure 212 is exposed to prevailing winds and produces increased drag.

Moreover, to facilitate resistance training for sports that rely on short bursts of activity, it is important for the parachute structure 212 to rapidly insufflate. Rapid insufflation of the parachute structure 212 may be achieved using several different features of the apparel item 100. For example, by locating the intake ducts 120 and 122 on different portions of the apparel item 100, the opportunity to capture and channel air flowing over the apparel item 100 is increased. Moreover, providing multiple intake ducts increases the volume of air that is captured by the intake ducts 120 and 122 at any given point in time.

Another feature that may contribute to rapid insufflation is the anterior-to-posterior orientation of the intake ducts 122, 124, and/or 126. As an example, the medial intake ducts 124 may be oriented as shown in FIG. 6 so that they angle slightly upward from an anterior to a posterior direction. This orientation of the medial intake ducts 124 helps to quickly channel air into the larger superior portion of the parachute structure 212 as shown in FIG. 2B. Yet another feature that contributes to rapid insufflation is positioning the ingress openings 620 of the medial intake ducts 124 such that they extend further anteriorly on the apparel item 100 as compared to the opening(s) of the lateral intake ducts 126. This prevents the larger opening(s) associated with the lateral intake duct 126 from inhibiting air flow into the smaller ingress openings 620 associated with the medial intake ducts 124.

The expansion pattern shown in FIG. 2B for the parachute structure 212 is exemplary only. For example, it is contemplated herein that the parachute structure 212 may have a more uniform pattern of expansion such that the superior portion of the structure 212 inflates to generally the same degree as the inferior portion of the parachute structure 212. This may be achieved by configuring the panel used to form the parachute structure 212 such that the width of the parachute structure 212 is uniform. In another example, the inferior portion of the parachute structure 212 may be configured to inflate to a greater degree than the superior portion. This may be achieved by configuring the panel used to form the parachute structure 212 such that the width of the panel is greater towards the inferior portion as compared to the superior portion of the panel. In yet another example, the length of the panel used to form the parachute structure 212 may be adjusted to provide for a greater anterior-to-posterior expansion or a lesser anterior-to-posterior expansion (e.g., decreasing the length would lessen anterior-to-posterior expansion and increasing the length would increase anterior-to-posterior expansion).

Further, it is contemplated herein, that the features described above with respect to the intake ducts 122, 124, and 126 and the parachute structure 212 can be customized to provide optimal resistance training for different types of sports. For instance, intake ducts may be located on different portions of the apparel item 100 to take advantage of prevailing wind flow patterns associated with a particular sport. The number of intake ducts may be increased to increase the rate of expansion of the parachute structure 212 for sports that require quick bursts of activity, or the number of intake ducts may be reduced to slow the rate of expansion for sports that require more sustained levels of activity. As well, the orientation of the intake ducts may be adjusted to promote more rapid insufflation of certain areas of the parachute structure 212. Continuing, the expansion pattern of the parachute structure 212 may be modified to provide varying levels of air resistance and/or to take advantage of certain body positions associated with particular sports. Moreover, the parachute structure 212 may be formed from materials that enable air within the space between the parachute structure 212 and the back panel 210 to dissipate more quickly if a lower level of air resistance is needed or to dissipate less quickly if a higher sustained level of air resistance is needed. Any and all aspects, and any variation thereof, are contemplated as being within the scope herein.

Once the wearer of the apparel item 100 ceases or slows movement or locomotion, air may passively exit the parachute structure 212 via, for instance, traveling from a posterior to an anterior direction through the intake ducts 120 and 122 in addition to exiting other areas such as, for example, around the sleeve openings 116 and 118, and/or around the bottom margin of the back panel 210. As stated above, air that flows into the apparel item via the intake ducts 120 and 122 may also help to cool the wearer. When the wearer ceases or slows movement, the air in the apparel item 100 that has been heated by the wearer may exit the apparel item 100 thereby helping to dissipate wearer-generated heat and to dissipate moisture vapor produced by the wearer.

Figure 3:
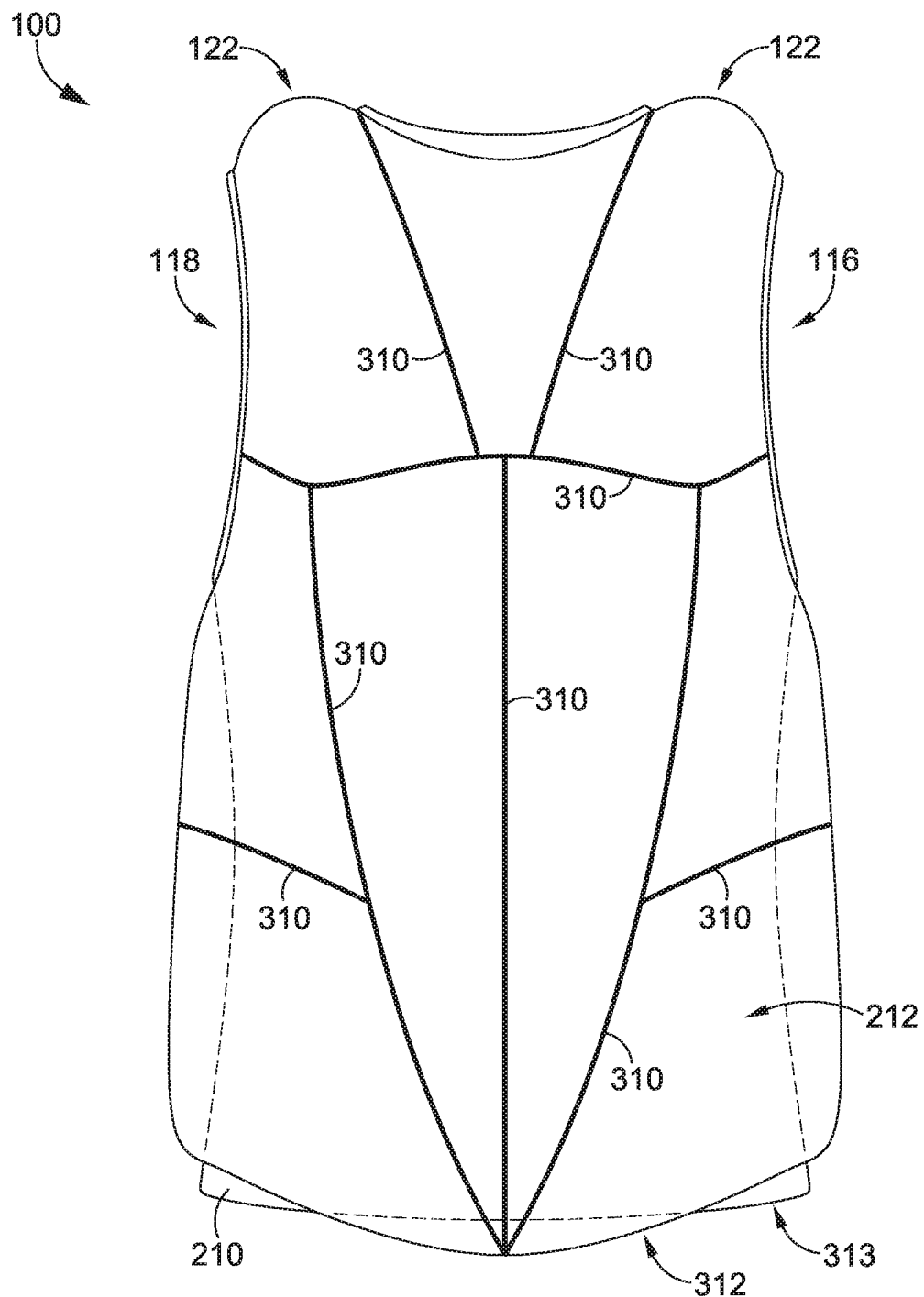
FIG. 3 illustrates a back view of the exemplary shirt having the integrated parachute structure of FIG. 1 in accordance with aspects herein.

FIG. 3 depicts a back view of the apparel item 100 in accordance with aspects herein. As shown, the parachute structure 212 overlays or is positioned adjacent to an outer-facing surface of the back panel 210 (shown by the dashed line) of the apparel item 100 and may be affixed to the apparel item 100 at the various attachment points described herein. For instance, as described, a bottom margin 312 of the parachute structure 212 may be affixed in whole or in part to a bottom margin 313 of the back panel 210 (either continuously or discontinuously). The parachute structure 212 may comprise a plurality of reinforcement cords or strips 310 to help provide structure to the parachute structure 212 when inflated. The reinforcement strips 310 may comprise, for instance, a polyurethane or thermoplastic polyurethane tape, a fabric tape, a silicone strip, a memory wire, and the like. In exemplary aspects, the reinforcement strips 310 may be positioned on the parachute structure 212 to cause a particular expansion pattern. For instance, areas of the parachute structure 212 on which the reinforcement strips 310 are positioned may not inflate to the same degree as the portions of the parachute structure 212 located between the reinforcement strips 310. Thus, the reinforcement strips 310 may be used to selectively inflate different portions of the parachute structure 212 to different degrees.

Figure 7:
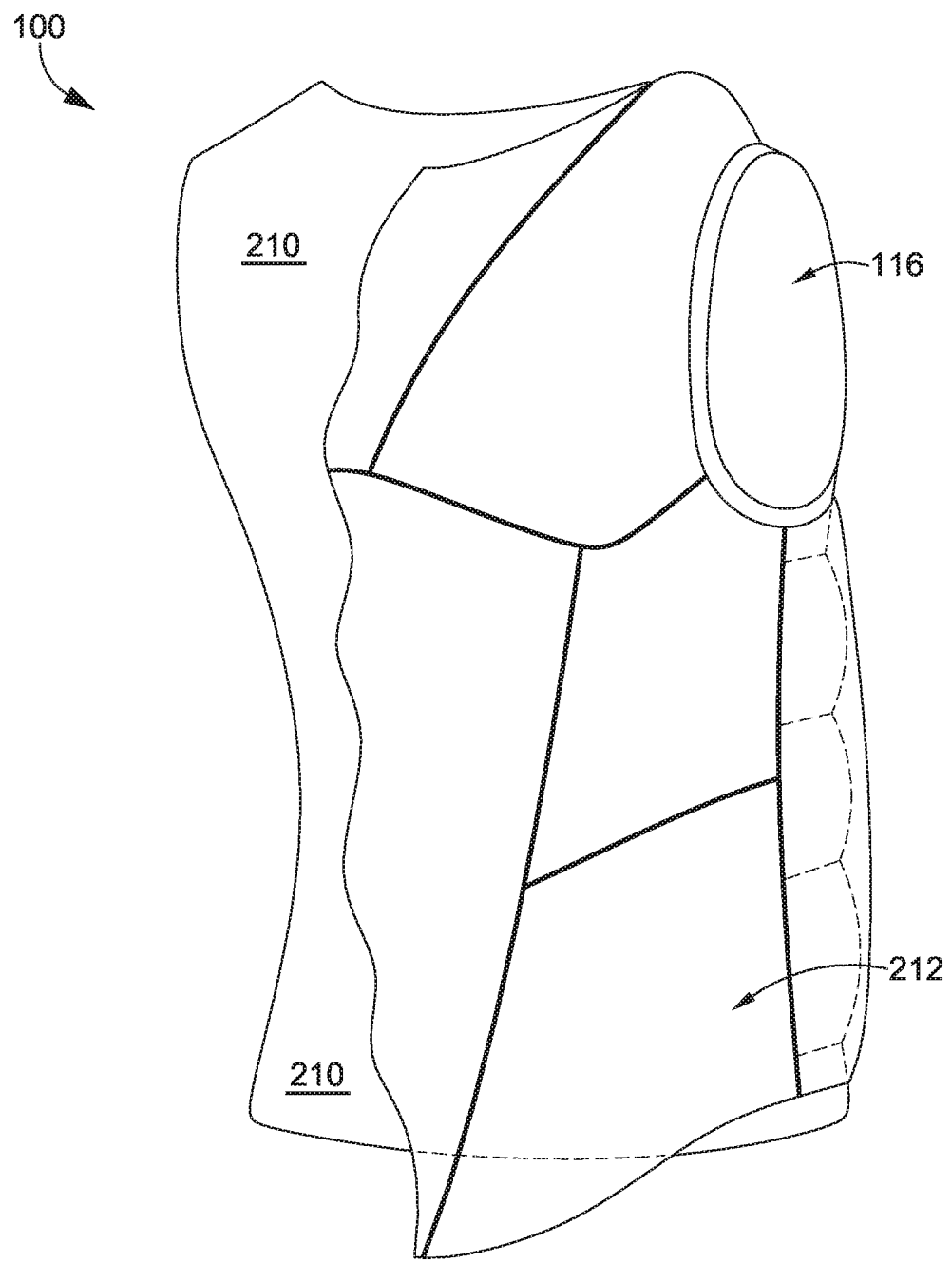
FIG. 7 illustrates a back perspective view of the exemplary shirt having the integrated parachute structure of FIG. 1 with a portion of the parachute structure cut away in accordance with aspects herein.

FIG. 7 depicts a back perspective view of the apparel item 100 with a portion of the parachute structure 212 cut away in accordance with aspects herein. FIG. 7 is provided to further illustrate how the parachute structure 212 overlays or is positioned adjacent to an outer-facing surface of the back panel 210 of the apparel item 100.

Figure 8:
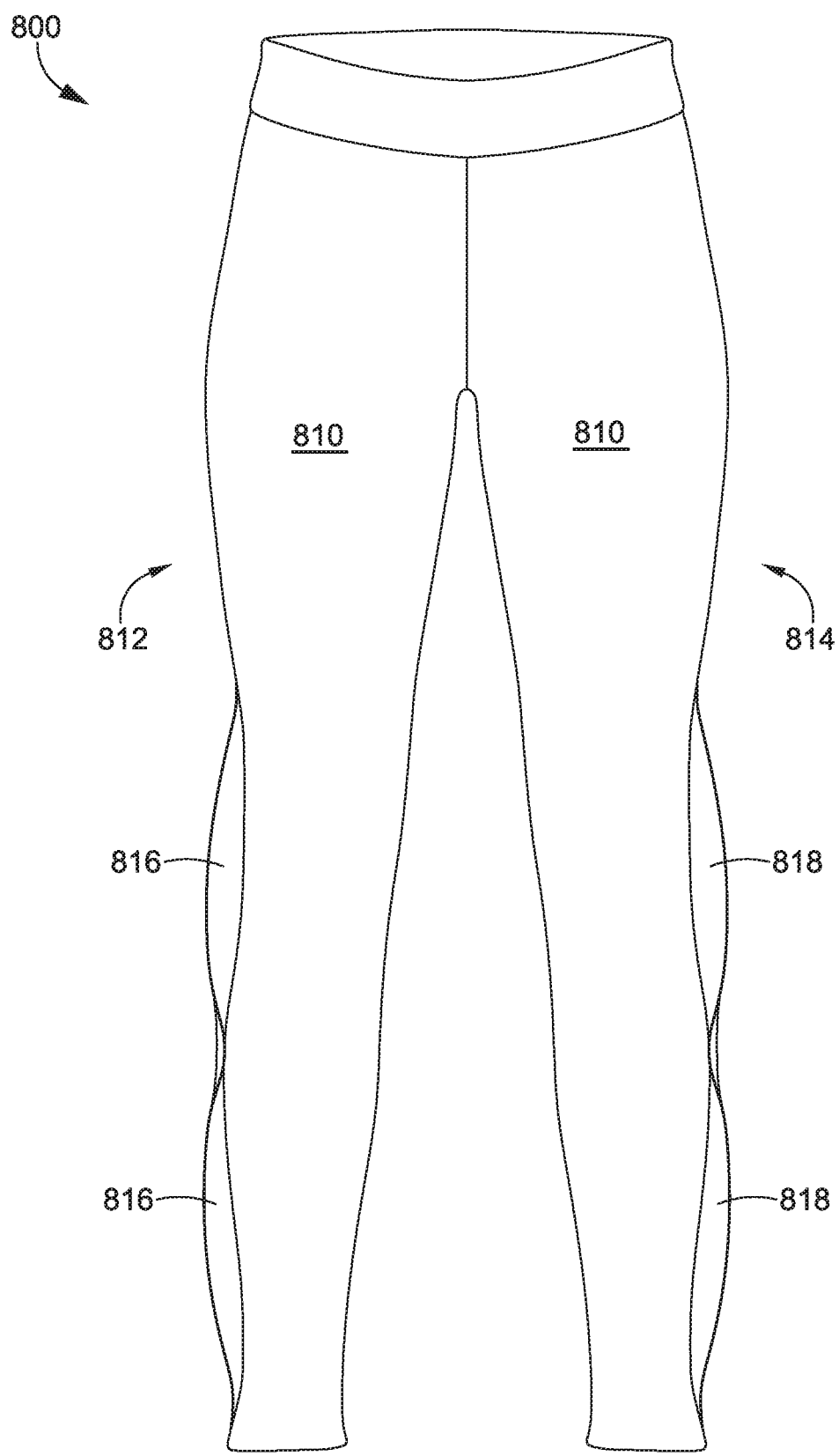
FIG. 8 illustrates a front view of an exemplary pant having an integrated parachute structure in accordance with aspects herein.

Turning now to FIG. 8, FIG. 8 illustrates another exemplary apparel item 800 with an integrated parachute structure in accordance with aspects herein. The apparel item 800 comprises an apparel item for a lower torso of a wearer such as a pant. Although shown as a pant, it is contemplated herein, that the apparel item 800 may be in the form of a short, or a three-quarter pant. Any and all aspects, and any variation thereof, are contemplated as being within the scope herein. The apparel item 800 may comprise additional features not shown and/or discussed such as pockets, zippers, a waistband, and the like.

As shown in FIG. 8, the apparel item 800 comprises at least a front panel 810 that may form at least an anterior aspect of a first and second leg portion 812 and 814. In exemplary aspects, the front panel 810 may be formed of materials suitable for athletic wear. For instance, the materials used to form the front panel 810 may comprise knit materials, woven materials, or a combination of knit and woven materials that exhibit stretch properties, moisture-management properties, and/or varying levels of air permeability.

As further shown in FIG. 8, the apparel item 800 comprises a first set of intake ducts 816 positioned on the first leg portion 812 and a second set of intake ducts 818 positioned on the second leg portion 814. In an exemplary aspect, the intake ducts 816 and 818 are generally positioned along the lateral edges of the first leg portion 812 and the second leg portion 814 respectively. By positioning the intake ducts 816 and 818 along the lateral edges of the apparel item 800, the intake ducts 816 and 818 are prevented from interfering with the wearer's movements or gait.

The intake ducts 816 and 818 may be formed from a material or textile that is substantially impermeable to air. For instance, the intake ducts 816 and 818 may be formed from a material that has a CFM rating or value of 40, 30, 20, or less. Exemplary materials may comprise tightly knitted or woven fabrics, fabrics treated with a waterproof membrane such as PTFE, polyurethane materials, rubber materials, plastic materials, and the like. In exemplary aspects, the materials used to form the intake ducts 816 and 818 may also be resistant to water. For example, the materials may be treated with a durable water repellant (DWR) finish. Additionally, in exemplary aspects, the material used to form the intake ducts 816 and 818 may comprise a lightweight or ultra-lightweight fabric so as not to appreciably increase the weight of the apparel item 800. In exemplary aspects, the material used to form the intake ducts 816 and 818 may have a weight between 20 gsm to 60 gsm, between 30 gsm to 45 gsm, or between 35 gsm and 43 gsm, although weights above and below these values are contemplated herein. Any and all aspects, and any variation thereof, are contemplated as being within the scope herein.

The intake ducts 816 and 818 may each comprise two ducts as shown in FIG. 8, although it is contemplated herein that the intake ducts 816 and 818 may each comprise a single duct or may comprise more than two ducts. Any and all aspects, and any variation thereof, are contemplated as being within the scope herein. Each intake duct 816 and 818 has an opening that is oriented to face in an anterior or forward direction when the apparel item 800 is worn. In an optional aspect, the edges of the openings of the intake ducts 816 and 818 (shown en face in FIG. 8) may be reinforced with, for example, a seam tape or other type of stiffening member to help maintain the ducts 816 and 818 in an open, or partially open, configuration.

Figure 9A:
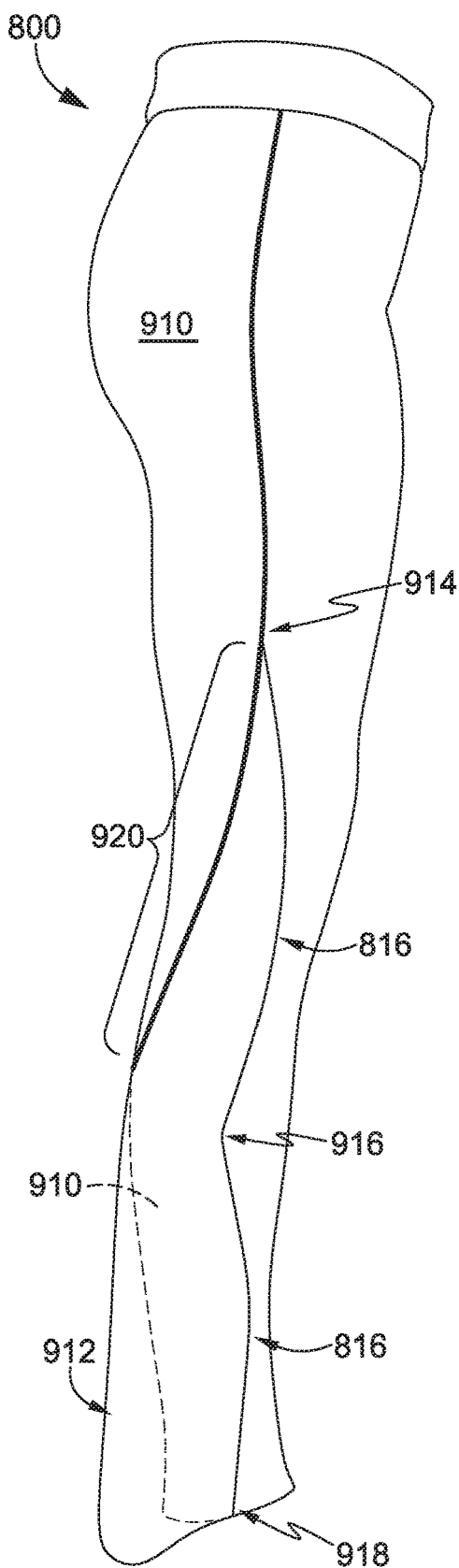
FIG. 9A illustrates a right side view of the exemplary pant having the integrated parachute structure of FIG. 8 where the parachute structure is in a slack state in accordance with aspects herein.
Figure 9B:
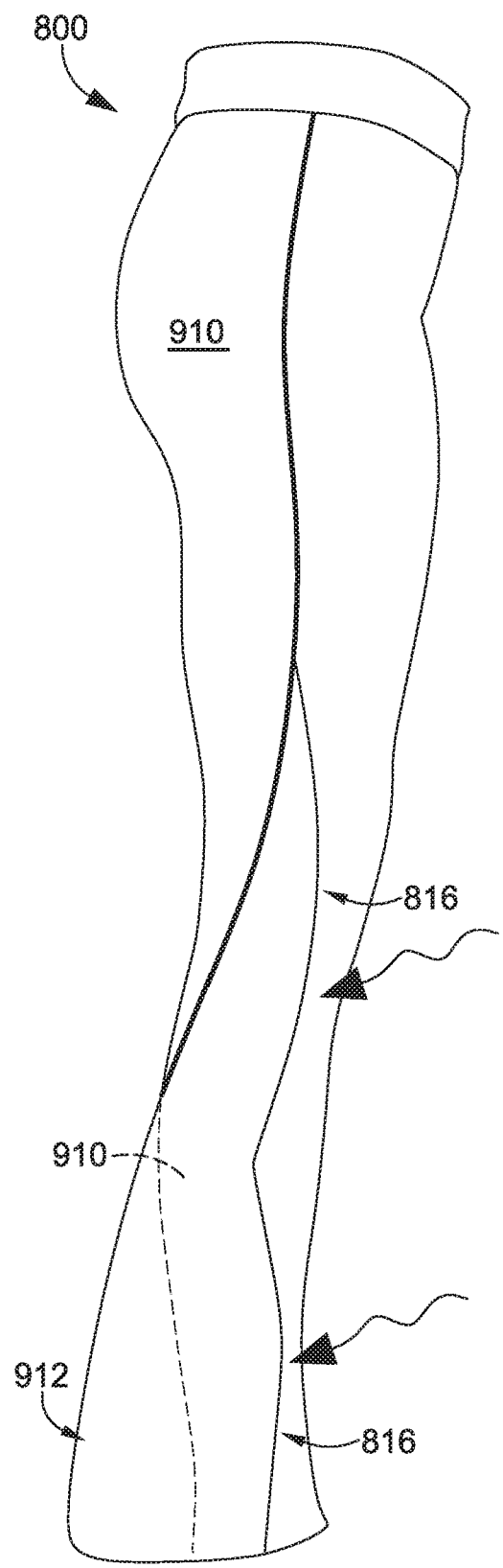
FIG. 9B illustrates a right side view of the exemplary pant having the integrated parachute structure of FIG. 8 where the parachute structure is in an inflated state in accordance with aspects herein.
Figure 10:
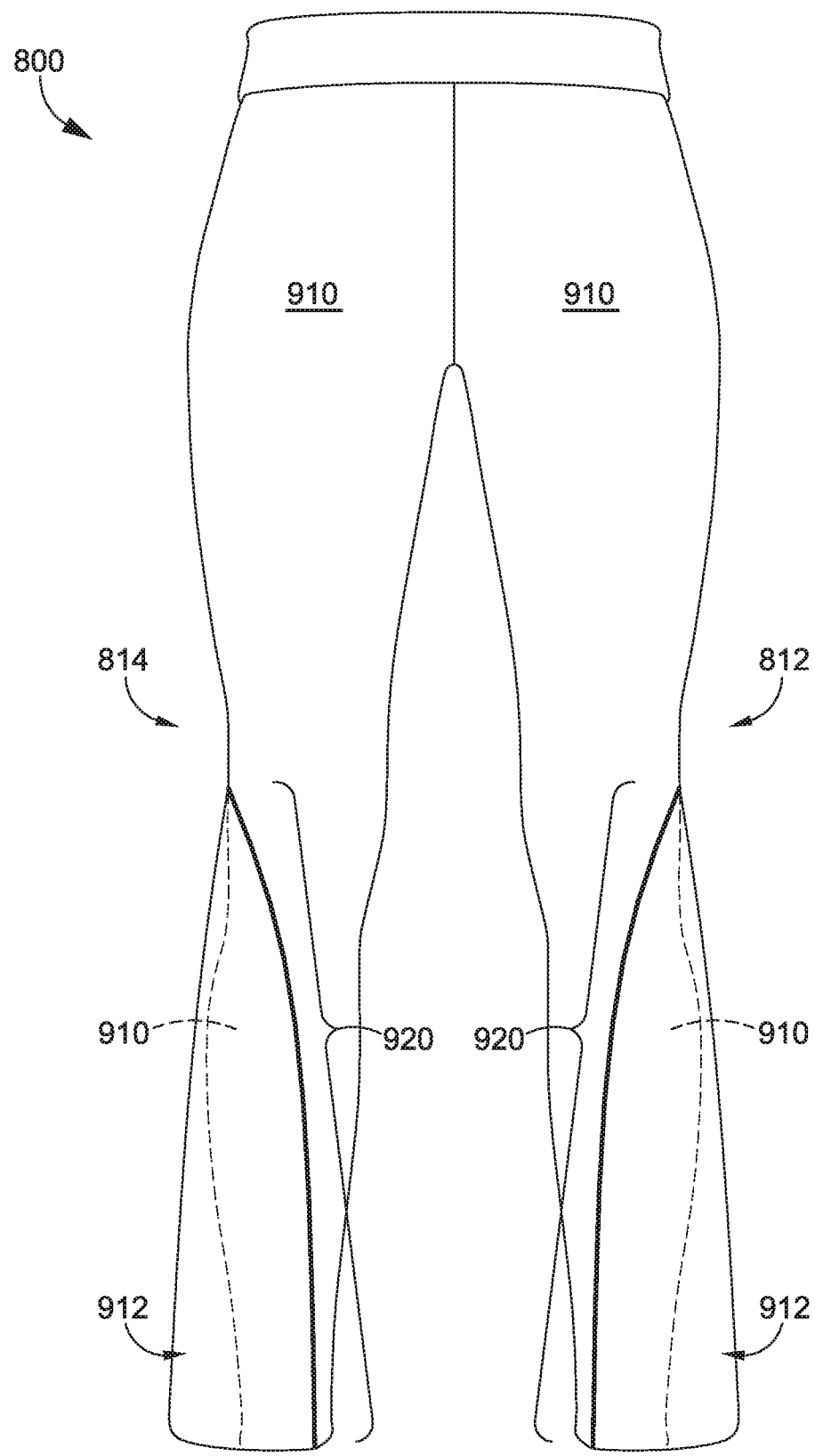
FIG. 10 illustrates a back view of the exemplary pant having the integrated parachute structure of FIG. 8 in accordance with aspects herein.
Figure 11:
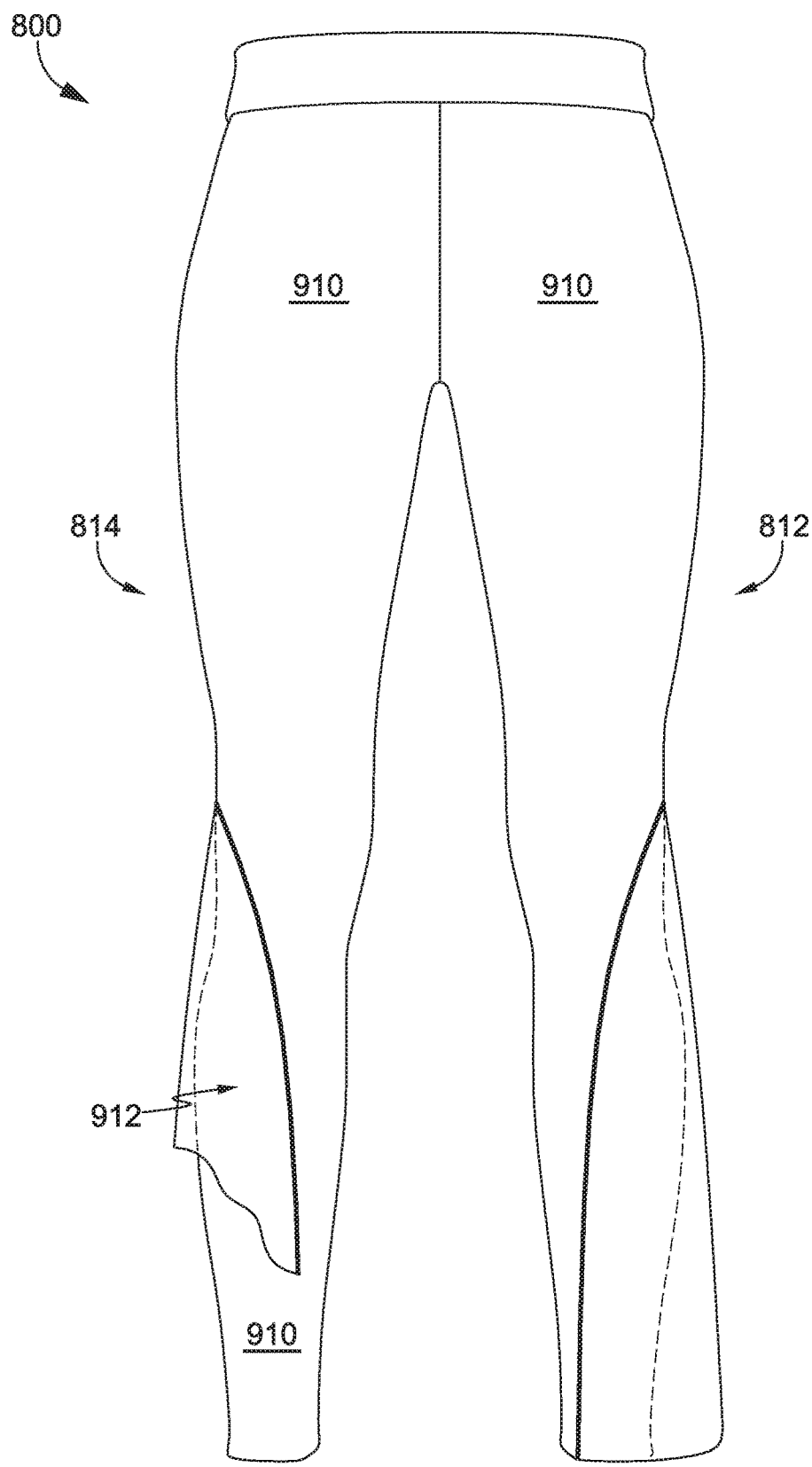
FIG. 11 illustrates a back view of the exemplary pant having the integrated parachute structure of FIG. 8 with a portion of the parachute structure cut away in accordance with aspects herein.

In exemplary aspects, the intake ducts 816 and 818 are formed by overlaying or positioning a parachute structure over a back panel of the apparel item 800 and selectively affixing the parachute structure to the apparel item 800 to form the intake ducts 816 and 818. This is better shown with respect to FIGS. 9A-11. For instance, FIGS. 9A and 9B depict right side views of the apparel item 800 and FIGS. 10 and 11 depict a back view of the apparel item 800 in accordance with aspects herein. With respect to FIG. 9A, the apparel item 800 further comprises a back panel 910 (shown in part by the dashed line to indicate that it is hidden from view) and a parachute structure 912 in a slack state. The back panel 910 may comprise a separate panel from the front panel 810 and may be coupled to the front panel 810 either directly or via one or more side panels. In another exemplary aspect, the back panel 910 may be integrally formed with the front panel 810 via, for instance, a knitting or weaving process. Any and all aspects, and any variation thereof, are contemplated as being within the scope herein. In either regard, the back panel 910 along with the front panel 810 may help to define in whole or in part a waist opening, the first and second leg portions 812 and 814, and leg openings for the apparel item 800. The back panel 910 may be formed from a woven material, a knit material, or a combination of woven and knit materials. In exemplary aspects, the textile material may be selected for athletic wear. For instance, the textile material used to form the back panel 910 may exhibit stretch properties, moisture-management properties, and/or varying levels of air permeability.

The parachute structure 912 comprises an oversized back panel that overlays in whole or in part the back panel 910 of the first and second leg portions 812 and 814 at select locations such that a space or void is maintained between an inner-facing surface of the parachute structure 912 and an outer-facing surface of the back panel 910. This aspect is depicted in FIG. 11 which illustrates a back view of the apparel item 800 with a portion of the parachute structure 912 cut away on the second leg portion 814 in accordance with aspects herein. As shown in FIG. 11, the parachute structure 912 overlays or is positioned adjacent to an outer-facing surface of the back panel 910 of the apparel item 800.

As used with respect to the apparel item 800, the term "oversized" may mean that the parachute structure 912 may have a longer width (as measured from a first lateral side to a second lateral side of the parachute structure 912) than the portion of the back panel 910 over which the parachute structure 912 is positioned, and/or the parachute structure 912 may have a longer length (as measured from a superior end of the parachute structure 912 to an inferior end of the parachute structure 912) than the portion of the back panel 910 over which the parachute structure 912 is positioned. Any and all aspects, and any variation thereof, are contemplated as being within the scope herein.

The parachute structure 912 may be formed from a material or textile that is substantially impermeable to air. For instance, the material used to form the parachute structure 912 may have a CFM rating of 40, 30, 20 or less. Exemplary materials may comprise tightly knitted or woven fabrics, fabrics treated with a waterproof membrane such as PTFE, polyurethane materials, rubber materials, plastic materials, and the like. In exemplary aspects, the materials used to form the parachute structure 912 may also be resistant to water. For example, the materials may be treated with a durable water repellant (DWR) finish. Additionally, in exemplary aspects, the material used to form the parachute structure 912 may comprise a lightweight or ultra-lightweight fabric so as not to appreciably increase the weight of the apparel item 800. In exemplary aspects, the material used to form the parachute structure 912 may have a weight between 20 gsm to 60 gsm, between 30 gsm to 45 gsm, or between 35 gsm and 43 gsm, although weights above and below these values are contemplated herein. Any and all aspects, and any variation thereof, are contemplated as being within the scope herein.

In exemplary aspects, the parachute structure 912 may be selectively affixed to the apparel item 800. As shown best in FIG. 9A, a first anterior edge of the parachute structure 912 may be releasably or permanently affixed to the apparel item 800 at a first attachment point 914 located generally at a lateral mid-thigh portion of the first and second leg portions 812 and 814, at a second attachment point 916 located generally at a lateral mid-calf portion of the first and second leg portions 812 and 814, and at a third attachment point 918 located generally at or near a lateral bottom margin of the first and second leg portions 812 and 814.

As best shown in FIG. 9A and in FIG. 10, which illustrates a back view of the apparel item 800, a second posterior edge of the parachute structure 912 may be continuously affixed (releasably or permanently) along its length to the back panel 910 as indicated by bracketed reference numeral 920. In exemplary aspects, the attachment area 920 generally begins superiorly at a lateral edge of the leg portions 812 and 814 and extends inferiorly to terminate at a medial edge of the leg portions 812 and 814 at the bottom margin of the leg portions 812 and 814. Continuing, the bottom or inferior margin of the parachute structure 912 may be continuously or discontinuously affixed to the bottom or inferior margin of the back panel 910.

As mentioned, the parachute structure 912 may form all or part of the intake ducts 816 and 818. For example, as shown in FIG. 9A, the intake ducts 816 may be formed from the parachute structure 912. More specifically, the anterior edge of the parachute structure 912 is affixed to the apparel item 800 at the first attachment point 914, the second attachment point 916, and the third attachment point 918, and the intervening span of material between these attachment points 914, 916, and 918 forms the openings to the intake ducts 816. Thus, the intake ducts 816 and 818 are integrally formed from and extend from the parachute structure 912.

As described, the intake ducts 816 and 818 comprise openings that are oriented to face anteriorly or forward when the apparel item 800 is worn. By orienting the openings to face anteriorly, air that is flowing over the front of the apparel item 800 may be channeled posteriorly via the openings of the intake ducts 816 and 818 into the space between the parachute structure 912 and the back panel 910 thereby inflating the parachute structure 912 as shown in FIG. 9B where the air flow is indicated by the arrows. Air may be retained in this space by forming the parachute structure 912 from a wind-resistant material. Further, by continuously affixing the posterior edge of the parachute structure 912 to the back panel 910 of the apparel item 800 as indicated by reference numeral 920, egress of air within the space between the parachute structure 912 and the back panel 910 is restricted.

Once the wearer of the apparel item 800 ceases or slows movement or locomotion, air within the space between the parachute structure 912 and the back panel 910 of the apparel item 800 may passively exit via, for instance, the intake ducts 816 and 818 and/or at the bottom margins of the leg portions 812 and 814.

The expansion pattern of the parachute structure 912 may be varied by adjusting the length and/or width of the parachute structure 912. For instance, the length of the parachute structure 912 as measured from a superior to inferior aspect may be increased to provide a greater anterior-to-posterior expansion of the parachute structure 912. Conversely, the length of the parachute structure 912 may be reduced to limit the anterior-to-posterior expansion of the structure 912. Moreover, the width of the parachute structure 912 may be increased to cause a greater lateral-to-medial expansion of the parachute structure 912, and the width may be reduced to decrease the amount of lateral-to-medial expansion.

Other features of the parachute structure 912 may be adjusted to provide differing levels or patterns of air resistance for the wearer of the apparel item 800. For example, increasing the number of ducts 816 and 818 or the size of the duct openings may cause more rapid insufflation of the parachute structure 912 and a resultant rapid increase in air resistance, while decreasing the number or size of the ducts 816 and 818 may cause a more gradual insufflation and a more gradual increase in air resistance.

Moreover, the parachute structure 912 may be positioned at other locations on the apparel item 800. As shown in FIGS. 8-11, the intake ducts 816 and 818 as well as the parachute structure 912 are generally positioned along an inferior and posterior aspect of the leg portions 812 and 814. This positioning may be optimal for runners/sprinters as these athletes typically travel in a forward direction. However, it is contemplated herein that parachute structure 912 may be positioned anteriorly on the leg portions 812 and 814 and/or along superior aspects of the leg portions 812 and 814 to take advantage of prevailing wind flow patterns associated with particular sports or training exercises.

Continuing, in exemplary aspects, the parachute structure 912 may be formed from materials having a higher CFM value such that air within the space between the parachute structure 912 and the back panel 910 is dissipated more quickly to provide a more transient level of air resistance. Alternatively, materials having a lower CFM value may be used such that air within the space between the parachute structure 912 and the back panel 910 is dissipated less quickly to provide a higher more sustained level of air resistance. Any and all aspects, and any variation thereof, are contemplated as being within the scope herein.

Figure 20:
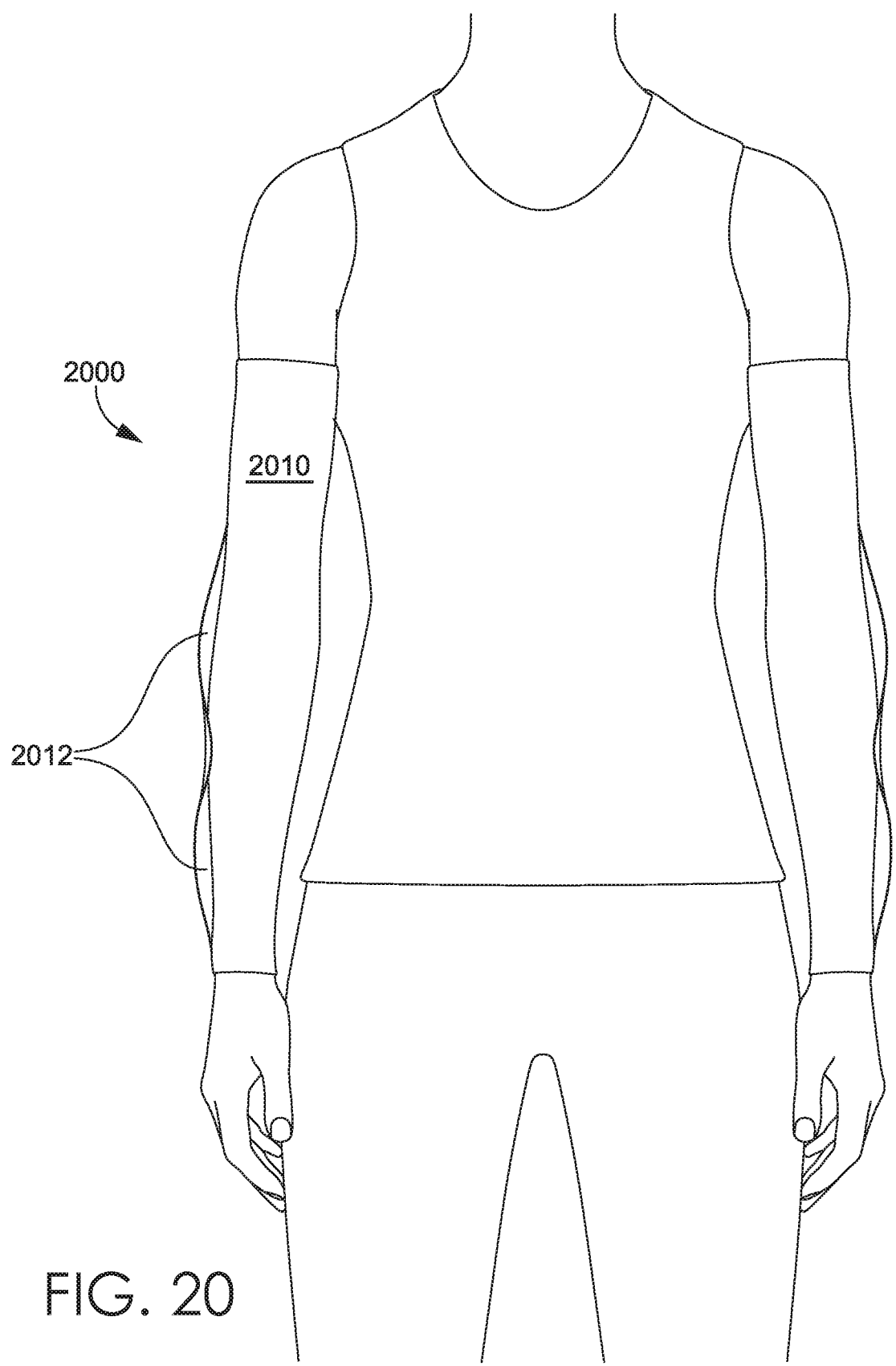
FIG. 20 illustrates a front view of an exemplary sleeve portion having an integrated parachute structure in accordance with aspects herein.
Figure 21A:
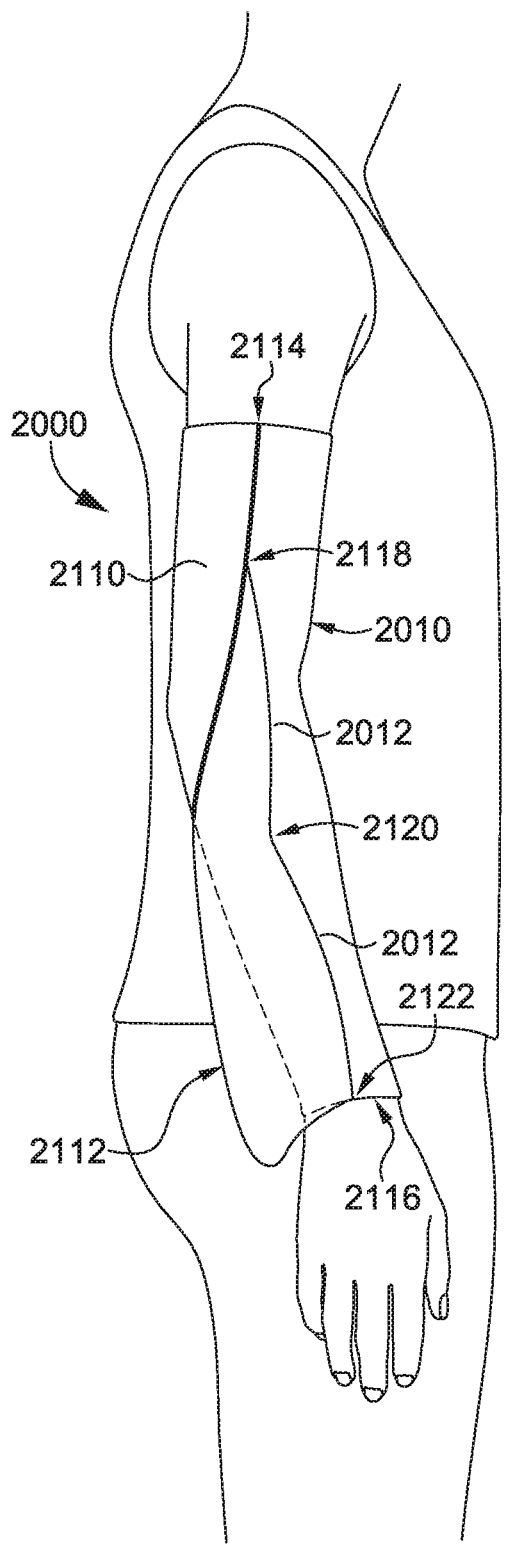
FIG. 21A illustrates a right side view of the exemplary sleeve portion having the integrated parachute structure of FIG. 20 where the parachute structure is in a slack state in accordance with aspects herein.
Figure 21B:
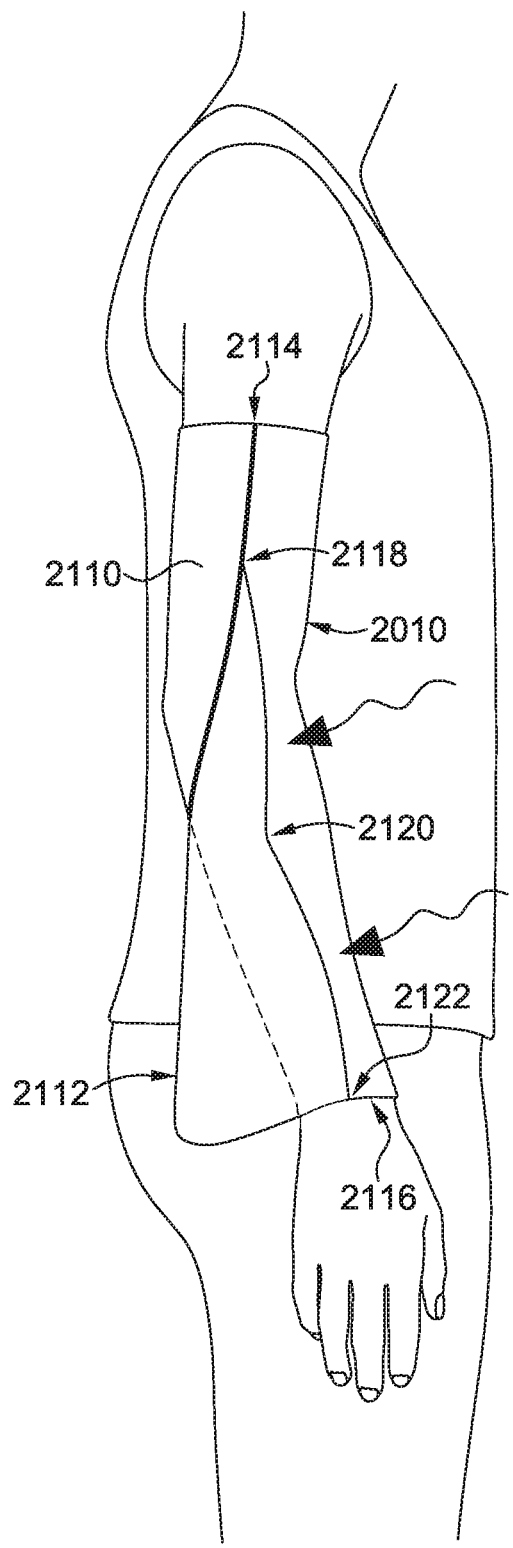
FIG. 21B illustrates a right side view of the exemplary sleeve portion having the integrated parachute structure of FIG. 20 where the parachute structure is in an inflated state in accordance with aspects herein.
Figure 22:
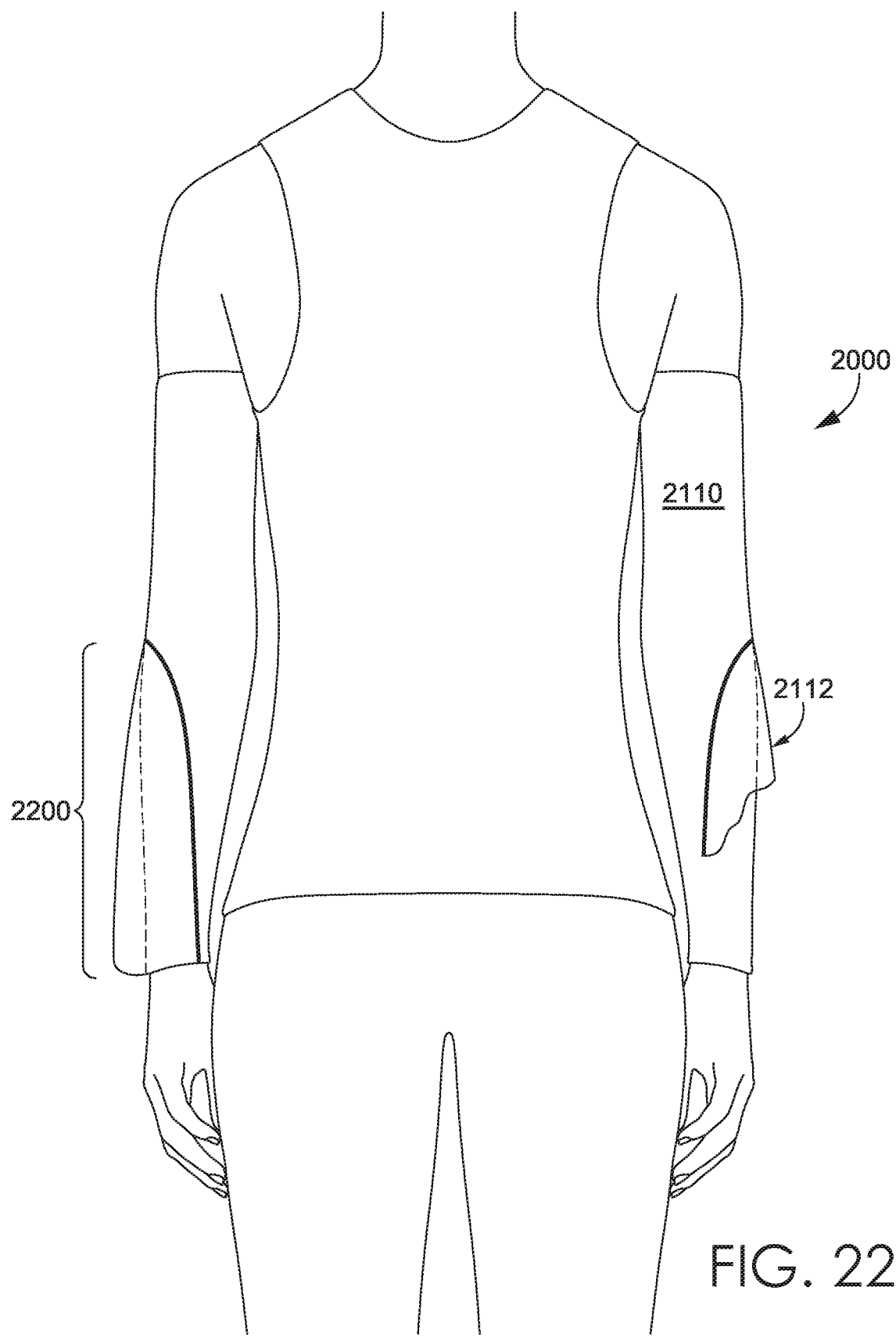
FIG. 22 illustrates a back view of the exemplary sleeve portion having the integrated parachute structure of FIG. 20 with a portion of the parachute structure cut away in accordance with aspects herein.

FIGS. 20-22 illustrate the configuration described above for the apparel item 800 as applied to a sleeve portion 2000. As shown in FIG. 20, which depicts a front view of a wearer wearing the sleeve portion 2000, the sleeve portion 2000 may comprise a removable sleeve (popularly known as a "sleeve skin") that may be drawn on a wearer's arm when desired (e.g., during training sessions). In other aspects, the sleeve portion 2000 may comprise a sleeve panel of a shirt or jacket. Any and all aspects, and any variation thereof, are contemplated as being within the scope herein. The discussion of the sleeve portion 2000 will generally focus on the right sleeve portion 2000 shown in FIG. 20. The discussion would be equally applicable to the left sleeve portion. The description of the materials used to form the different portions of the apparel item 800 (e.g., types of fabrics, characteristics of the fabric, CFM ratings, weight values, and the like) is equally applicable to the sleeve portion 2000.

FIG. 20 illustrates a front view of the sleeve portion 2000 in accordance with aspects herein. As shown in FIG. 20, the sleeve portion 2000 comprises a front panel 2010 that may form at least an anterior aspect of the sleeve portion 2000 when the sleeve portion 2000 is worn. The sleeve portion 2000 further comprises a set of intake ducts 2012 positioned along a lateral edge of the sleeve portion 2000. By positioning the intake ducts 2012 along the lateral edges of the sleeve portion 2000, the intake ducts 2012 are prevented from interfering with the wearer's movements or gait when the sleeve portion 2000 is worn.

The intake ducts 2012 may comprise two ducts as shown in FIG. 20, although it is contemplated herein that the intake ducts 2012 may comprise a single duct or may comprise more than two ducts. Any and all aspects, and any variation thereof, are contemplated as being within the scope herein. The intake ducts 2012 have openings that are oriented to face in an anterior or forward direction when the sleeve portion 2000 is worn. In an optional aspect, the edges of the openings of the intake ducts 2012 (shown en face in FIG. 20) may be reinforced with, for example, a seam tape or other type of stiffening member to help maintain the ducts 2012 in an open, or partially open, configuration.

In exemplary aspects, the intake ducts 2012 are formed by overlaying or positioning a parachute structure over a back panel of the sleeve portion 2000 and selectively affixing the parachute structure to the sleeve portion 2000 to form the intake ducts 2012. This is better shown with respect to FIGS. 21A-22. With respect to FIG. 21A, the sleeve portion 2000 further comprises a back panel 2110 (shown in part by the dashed line to indicate the portion that is hidden from view) and a parachute structure 2112 in a slack state. The back panel 2110 may comprise a separate panel from the front panel 2010 and may be coupled to the front panel 2010 either directly or via one or more additional panels. In another exemplary aspect, the back panel 2110 may be integrally formed with the front panel 2010 via, for instance, a knitting or weaving process. Any and all aspects, and any variation thereof, are contemplated as being within the scope herein. In either regard, the back panel 2110 along with the front panel 2010 may help to define in whole or in part an upper sleeve opening 2114 and a lower sleeve opening 2116 for the sleeve portion 2000.

The parachute structure 2112 comprises an oversized back panel that overlays in whole or in part the back panel 2110 of the sleeve portion 2000 at select locations such that a space or void is maintained between an inner-facing surface of the parachute structure 2112 and an outer-facing surface of the back panel 2110. This aspect is depicted in FIG. 22 which illustrates a back view of the sleeve portion 2000 with a portion of the parachute structure 2112 cut away in accordance with aspects herein. As shown in FIG. 22, the parachute structure 2112 overlays or is positioned adjacent to an outer-facing surface of the back panel 2110 of the sleeve portion 2000.

As used with respect to the sleeve portion 2000, the term "oversized" may mean that the parachute structure 2112 may have a longer width (as measured from a first lateral side to a second lateral side of the parachute structure 2112) than the portion of the back panel 2110 over which the parachute structure 2112 is positioned, and/or the parachute structure 2112 may have a longer length (as measured from a superior end of the parachute structure 2112 to an inferior end of the parachute structure 2112) than the portion of the back panel 2110 over which the parachute structure 2112 is positioned. Any and all aspects, and any variation thereof, are contemplated as being within the scope herein.

In exemplary aspects, the parachute structure 2112 may be selectively affixed to the sleeve portion 2000. As shown best in FIG. 21A, a first anterior edge of the parachute structure 2112 may be releasably or permanently affixed to the sleeve portion 2000 at a first attachment point 2118 located at a lateral, superior portion of the sleeve portion 2000, at a second attachment point 2120 located at an approximate midpoint of the sleeve portion 2000, and at a third attachment point 2122 located at a lateral, inferior or bottom margin of the sleeve portion 2000. More or less attachment points than those shown are contemplated as being within the scope herein.

As best shown in FIG. 22, which illustrates a back view of the sleeve portion 2000, a posterior edge of the parachute structure 2112 may be continuously affixed (releasably or permanently) along its length to the back panel 2110 as indicated by bracketed reference numeral 2200. In exemplary aspects, the attachment area 2200 generally begins superiorly at a lateral edge of the sleeve portion 2000 and extends inferiorly to terminate at a medial edge of the sleeve portion 2000 at the bottom margin of the sleeve portion 2000. Continuing, the bottom or inferior margin of the parachute structure 2112 may be continuously or discontinuously affixed to the bottom or inferior margin of the back panel 2110.

The parachute structure 2112 may form all or part of the intake ducts 2012. For example, as shown in FIG. 21A, the intake ducts 2012 may be formed from the parachute structure 2112. More specifically, the anterior edge of the parachute structure 2112 is affixed to the sleeve portion 2000 at the first attachment point 2118, the second attachment point 2120, and the third attachment point 2122, and the intervening span of material between these attachment points 2118, 2120, and 2122 forms the openings to the intake duct 2012. Thus, the intake ducts 2012 are integrally formed from and extend from the parachute structure 2112.

Similar to the apparel item 800, air flowing over the anterior face of the sleeve portion 2000 may be channeled posteriorly via the openings of the intake ducts 2012 into the space between the parachute structure 2112 and the back panel 2110 thereby inflating the parachute structure 2112 as shown in FIG. 21B where the air flow is indicated by the arrows. Air may be retained in this space by forming the parachute structure 2112 from a wind-resistant material. Further, by continuously affixing the posterior edge of the parachute structure 2112 to the back panel 2110 of the sleeve portion 2000 as indicated by reference numeral 2200, egress of air within the space between the parachute structure 2112 and the back panel 2110 is restricted.

Once the wearer of the sleeve portion 2000 ceases or slows movement or locomotion, air within the space between the parachute structure 2112 and the back panel 2110 of the sleeve portion 2000 may passively exit via, for instance, the intake ducts 2012 and/or at the bottom margins of the sleeve portion 2000. Similar to the apparel item 800, various features of the sleeve portion 2000 may be modified to, for instance, produce different expansion patterns, provide more rapid or less rapid insufflation, provide more prolonged insufflations, and the like.

Figure 12:
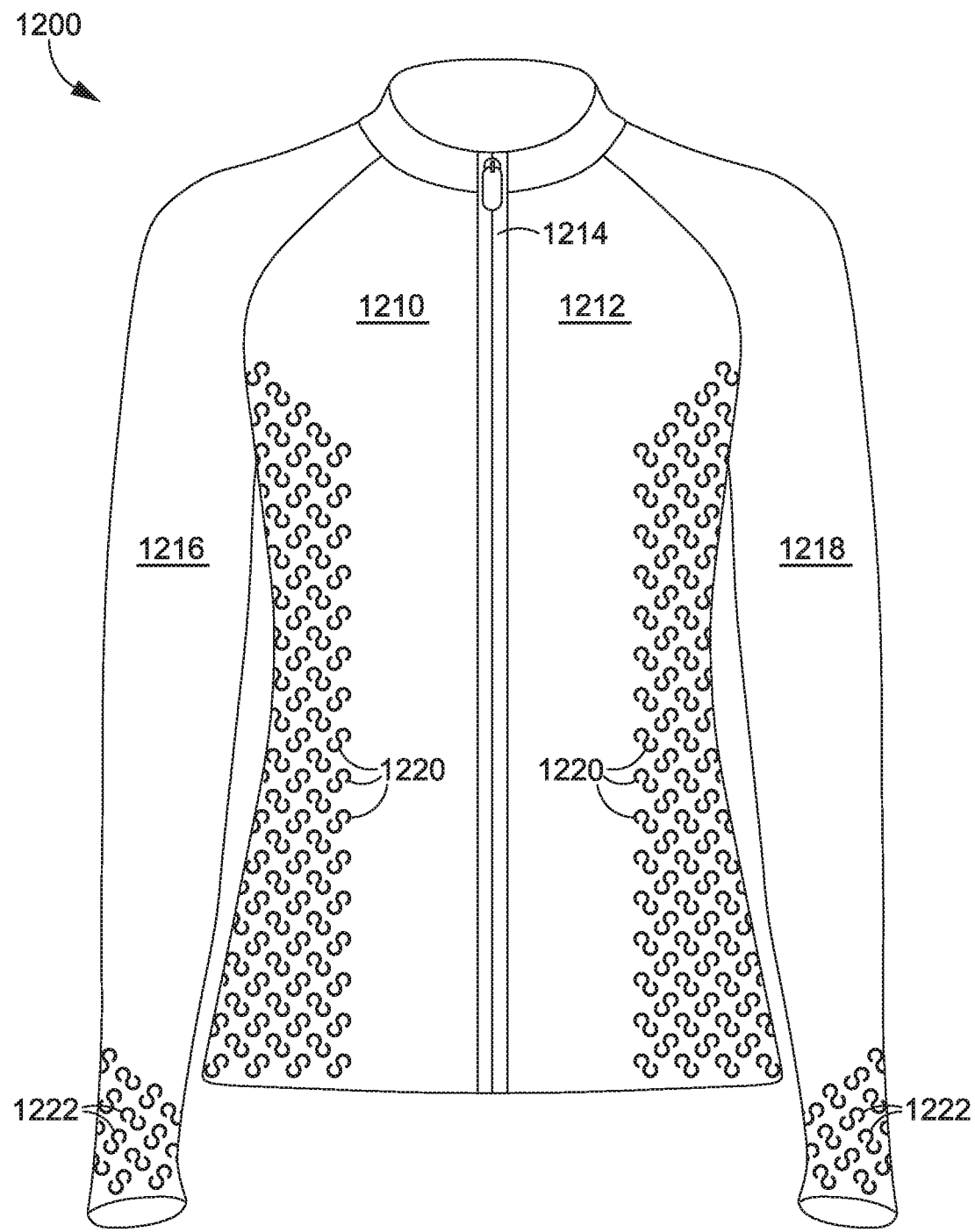
FIG. 12 illustrates a front view of an exemplary jacket having an integrated parachute structure in accordance with aspects herein.

Turning now to FIG. 12, a front view of another exemplary apparel item 1200 having an integrated parachute structure is illustrated in accordance with aspects herein. The apparel item 1200 is shown in the form of a jacket, although it is contemplated herein that the apparel item 1200 may be in the form of a shirt, a pant, and the like. Further, although shown as having long sleeves, it is contemplated herein that the apparel item 1200 may comprise no sleeves, quarter sleeves, half sleeves, three-quarter sleeves, and the like. It is also contemplated herein that the apparel item 1200 may comprise additional features not shown such as pockets and/or a hood. Any and all aspects, and any variation thereof, are contemplated as being within the scope herein.

As shown in FIG. 12, the apparel item 1200 comprises a first front panel 1210 and a second front panel 1212 that are releasably affixed to one another via a zipper-type mechanism 1214. The apparel item 1200 further comprises a first sleeve portion 1216 and a second sleeve portion 1218.

Figure 14:
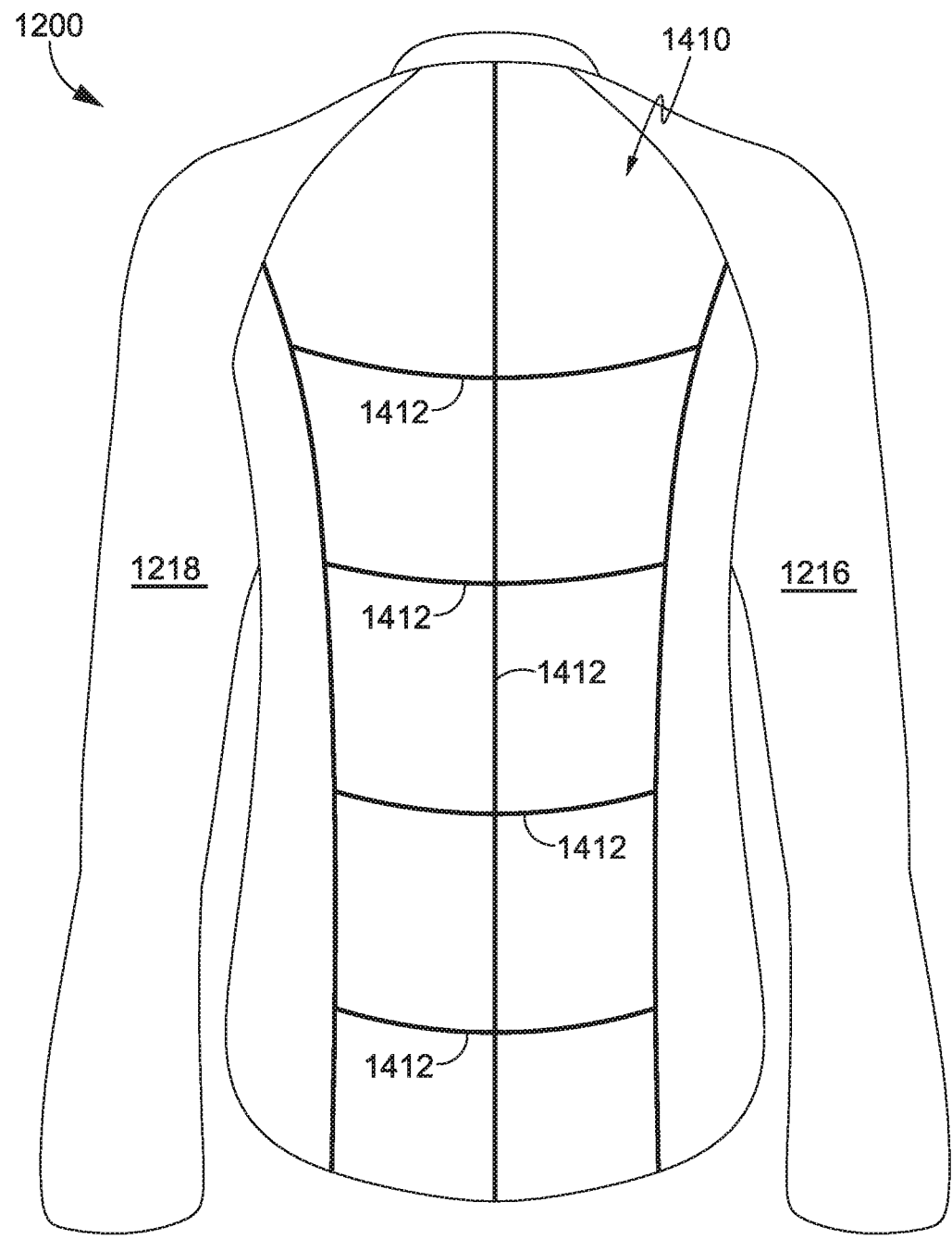
FIG. 14 illustrates a back view of the exemplary jacket having the integrated parachute structure of FIG. 12 in accordance with aspects herein.

FIG. 14 illustrates a back view of the exemplary apparel item 1200 in accordance with aspects herein. As shown in FIG. 14, the apparel item 1200 further comprises a back panel 1410. The back panel 1410 may comprise a separate panel from the first and second front panels 1210 and 1212 and may be coupled to the first and second front panels 1210 and 1212 either directly or via one or more side panels, gussets, or shoulder panels. In another exemplary aspect, the back panel 1410 may be integrally formed with the front panels 1210 and 1212 via, for instance, a knitting or weaving process. Any and all aspects, and any variation thereof, are contemplated as being within the scope herein. In either regard, the back panel 1410 along with the first and second front panels 1210 and 1212 may help to define in whole or in part a neck opening, first and second sleeve openings, and a waist opening for the apparel item 1200.

In one exemplary aspect, the front panels 1210 and 1212, the first and second sleeve portions 1216 and 1218, and the back panel 1410 may be formed from a material or textile that is substantially impermeable to air as indicated by the material having a CFM rating of 40, 30, 20 or less. Exemplary materials may comprise tightly knitted or woven fabrics, fabrics treated with a waterproof membrane such as PTFE, polyurethane materials, rubber materials, plastic materials, and the like.

In exemplary aspects, the materials used to form the front panels 1210 and 1212, the first and second sleeve portions 1216 and 1218, and the back panel 1410 may also be resistant to water. For example, the materials may be treated with a durable water repellant (DWR) finish. Additionally, in exemplary aspects, the material used to form the front panels 1210 and 1212, the first and second sleeve portions 1216 and 1218, and the back panel 1410 may comprise a lightweight or ultra-lightweight fabric so as not to appreciably increase the weight of the apparel item 1200. In exemplary aspects, the material used to form the front panels 1210 and 1212, the first and second sleeve portions 1216 and 1218, and the back panel 1410 may have a weight between 20 gsm to 60 gsm, between 30 gsm to 45 gsm, or between 35 gsm and 43 gsm, although weights above and below these values are contemplated herein.

Returning to FIG. 12, the first and second front panels 1210 and 1212 may each comprise a plurality of intake slits or ducts 1220 positioned towards the lateral edges or sides of the front panels 1210 and 1212 and extending from an upper portion of the front panels 1210 and 1210 to the bottom margin of the front panels 1210 and 1212. Further, in an optional aspect, the first and second sleeve portions 1216 and 1218 may comprise a plurality of intake slits or ducts 1222. As shown in FIG. 12, and also in FIG. 13A which illustrates a right side view of the apparel item 1200 when the back panel 1410 is in a slack state, the intake ducts 1220 and 1222 are generally positioned anteriorly on the apparel item 1200, and the intake ducts 1222 are further positioned along a lateral portion of the first and second sleeve portions 1216 and 1218. The locations of the intake ducts 1220 and 1222 is exemplary only and it is contemplated herein that the intake ducts 1220 and 1222 may be positioned at other areas of the apparel item 1200.

Figure 15:
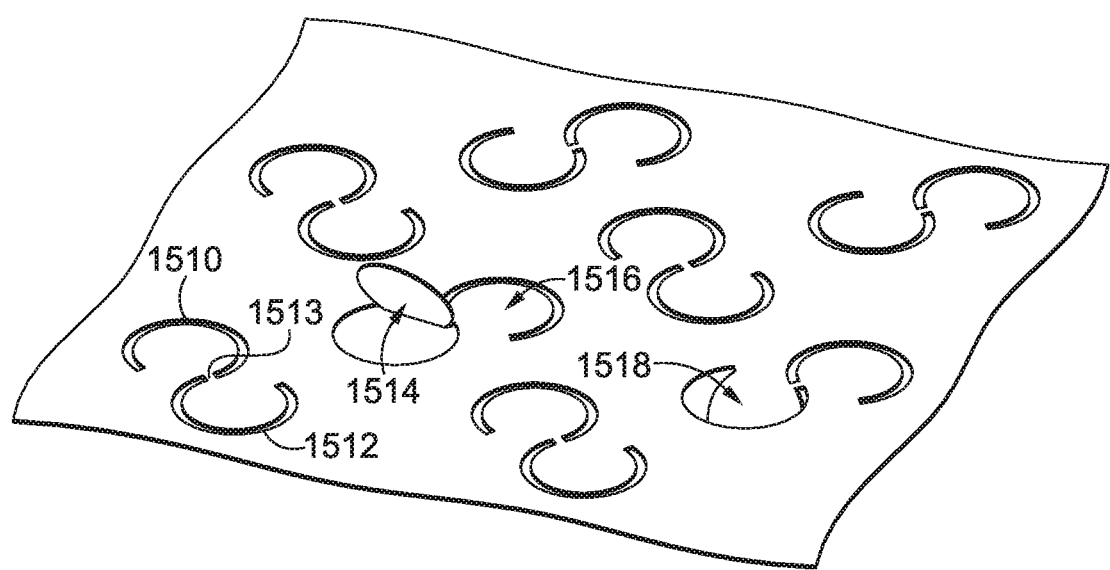
FIG. 15 illustrates a close-up view of a plurality of intake slits in accordance with aspects herein.

A close-up view of a section of the intake ducts 1220 and/or 1222 is shown in FIG. 15. As shown, each intake duct 1220 and/or 1222 may be formed by making a generally "S-shaped" cut in the material of the apparel item 1200 such that the cut extends through the thickness of the material. More particularly, each intake duct 1220 and/or 1222 comprises a first generally circular cut 1510 having an opening facing a first direction and a second generally circular cut 1512 having an opening facing a second direction opposite the first direction. The first cut 1510 has at least a first terminal end that is positioned adjacent to a terminal end of the second cut 1512 to complete the "S-shape." Moreover, a small extent of material 1513 is left between the terminal ends of the first and second cuts 1510 and 1512, where this piece of material 1513 may serve as a hinge point as described below.

By forming the intake ducts 1220 and 1222 as described, two flaps are created for each intake duct, where each flap covers an opening into the space between the apparel item 1200 and, for example, the wearer's body. FIG. 15 illustrates one of the flaps on a duct positioned in an upward open position as indicated by the reference numeral 1514 thus allowing air to flow freely into the apparel item 1200. This same duct would additionally have a second flap 1516 (shown in a neutral position) that, when in an upward open position would be in a generally adjacent planar relationship with the first flap 1514. The flaps 1514 and 1516 open with respect to the hinge point 1513. It is further contemplated herein that the flaps may be positioned in a downward open position as indicated by the reference numeral 1518. By configuring the intake ducts 1220 and 1222 as described, and by varying the orientation of the "S-shapes" as shown in FIG. 15, the intake ducts 1220 and 1222 are optimized to take advantage of different wind flow patterns engendered by the wearer's movements. For instance, when the flaps are in an upward open position, the flap itself may act to catch prevailing wind flow and direct it through the duct. This effect is multiplied by varying the orientation of the "S-shapes" throughout the apparel item 1200.

Figure 13A:
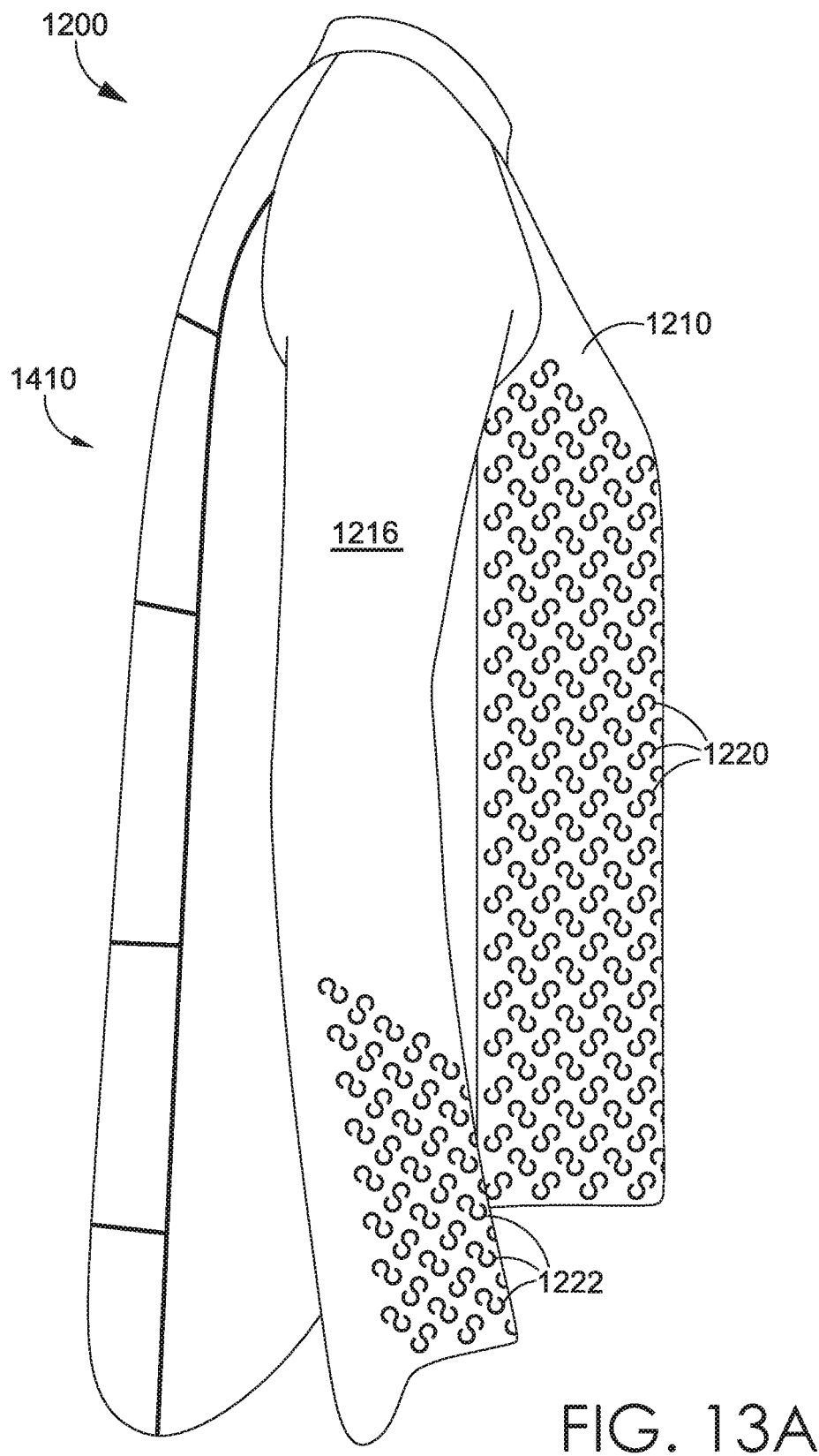
FIG. 13A illustrates a side view of the exemplary jacket having the integrated parachute structure of FIG. 12 where the parachute structure is in a slack state in accordance with aspects herein.
Figure 13B:
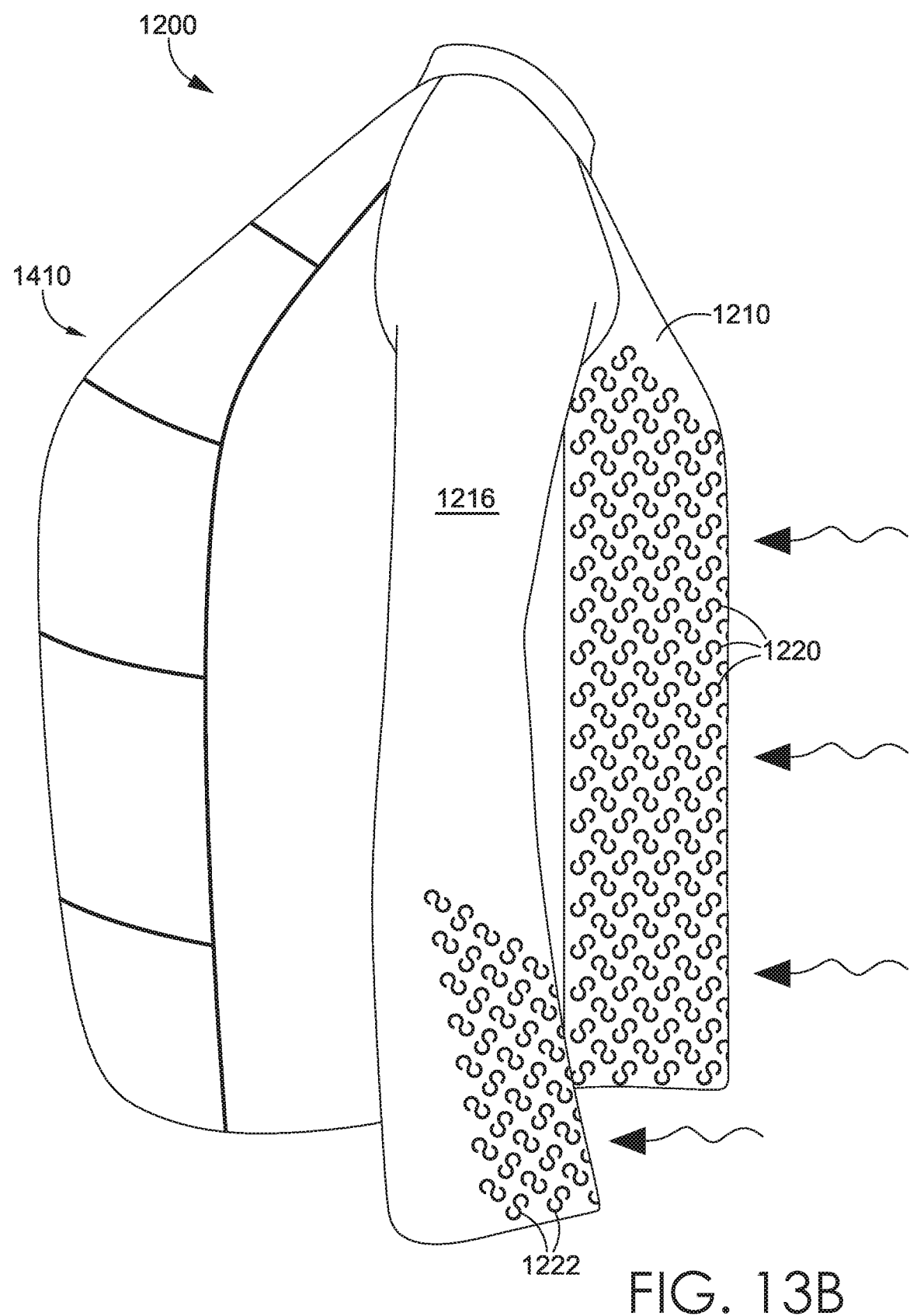
FIG. 13B illustrates a side view of the exemplary jacket having the integrated parachute structure of FIG. 12 where the parachute structure is in an inflated state in accordance with aspects herein.
Figure 16:
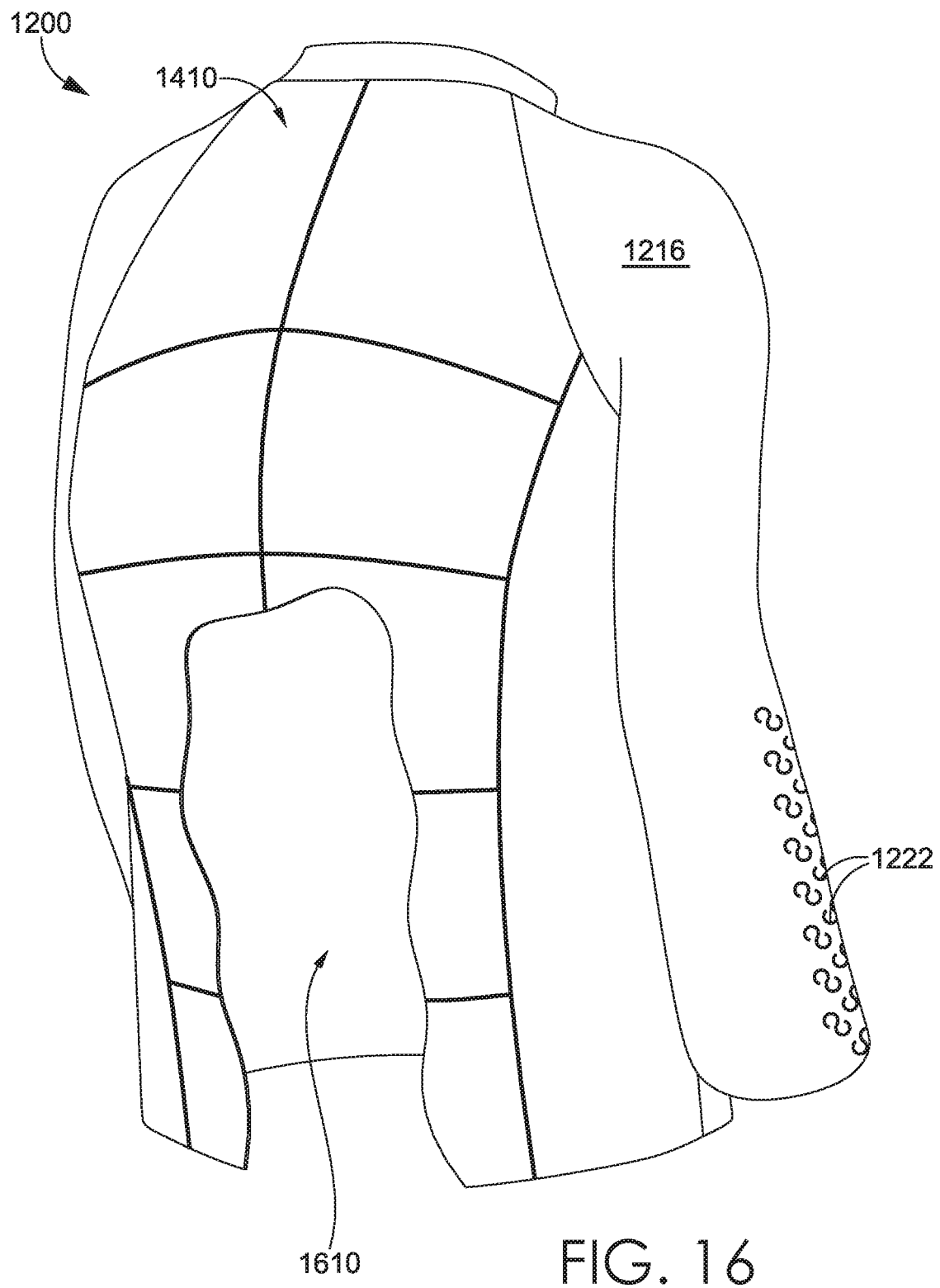
FIG. 16 illustrates a back perspective view of the exemplary jacket having the integrated parachute structure of FIG. 12 with a portion of the parachute structure cut away in accordance with aspects herein.

Turning now to FIGS. 13A and 13B, right side views of the apparel item 1200 are illustrated in accordance with aspects herein. A left-side view of the apparel item 1200 would generally disclose similar features. FIG. 13A depicts the apparel item 1200 with the back panel 1410 and the sleeve portion 1216 in a slack state, and FIG. 13B depicts the apparel item 1200 with the back panel 1410 and the sleeve portion 1216 in an inflated state. With respect to the apparel item 1200, instead of a parachute structure comprising a separate panel that overlays or is positioned adjacent to an outer-facing surface of a panel of an apparel item such as with the apparel item 100 or the apparel item 800, the back panel 1410 and the sleeve portions 1216 and 1218 function as the parachute structure. In other words, the back panel 1410 directly overlays or is directly positioned adjacent to the body of the wearer as shown by FIG. 16 which depicts a cut-away view of a portion of the back panel 1410. To function as a parachute structure, the back panel 1410 and/or the sleeve portions 1216 and 1218 may be configured to be over-sized. In other words, the back panel 1410 may be configured to have a greater width and/or a greater length than a typical panel used to form a back panel of a jacket, and the sleeve portions 1216 and 1218 may have a greater width and/or a greater length than typical sleeve portions used to form sleeve portions of a jacket. For instance, the back panel 1410 may have a width or length that is 1.5, 2, or 3 times the width of the front panels 1210 and 1212.

The back panel 1410 may transition from a slack state to an inflated state (seen in FIG. 13B) incident to air entering the plurality of ducts 1220 due to, for instance, the wearer of the apparel item 1200 initiating ground locomotion or other type of movement. More particularly, once air has entered the intake ducts 1220 it may flow posteriorly in the space between the inner-facing surface of the apparel item 1200 and the wearer's body and initiate insufflation of the back panel 1410. As well, the air entering the apparel item 1200 via the intake ducts 1220 may also help to cool the wearer by promoting, for instance, evaporative heat transfer. Moreover, because the apparel item 1200 is formed from a wind-resistant material, any air that enters the apparel item 1200 via the intake ducts 1220 is generally retained in the apparel item 1200 thereby helping to maintain a more sustained inflation of the back panel 1410. Sustained insufflation of the back panel 1410 may be further augmented by configuring the apparel item 1200 such that the neckline opening and the waist opening are restricted (via, for example, use of an elasticized neckline or waistline), thereby limiting the passive exit of air from the apparel item 1200.

Similarly, the sleeve portions 1216 and 1218 may transition from a slack state to an inflated state (seen in FIG. 13B) incident to air entering the plurality of intake ducts 1222 due to, for instance, the wearer of the apparel item 1200 initiating movement of the wearer's arms. Once air has entered the intake ducts 1222 it may flow within the space between the inner-facing surface of the sleeve portions 1216 and 1218 and the wearer's body and initiate posterior insufflation of the sleeve portions 1216 and 1218. Further, because the sleeve portions 1216 and 1218 are formed from a wind-resistant material, any air that enters the sleeve portions 1216 and 1218 via the ducts 1222 is generally retained in the sleeve portions 1216 and 1218. Insufflation of the sleeve portions 1216 and 1218 may be augmented by forming the apparel item 1200 such that the sleeve openings are restricted via, for instance, a tight-fitting cuff, thereby limiting the passive exit of air from the sleeve portions 1216 and 1218.

Once wearer movement slows or ceases, air within the apparel item 1200 may passively exist via the intake ducts 1220 and 1222 and/or other locations on the apparel item 1200 such as the neckline opening, the waist opening, and/or the sleeve openings to transition the back panel 1410 and the sleeve portions 1216 and 1218 back to a slack state. As well, exiting air may also help to cool the wearer by carrying moisture vapor away from the weare.

The expansion pattern of the back panel 1410 may be modified by the use of reinforcement strips as shown in FIG. 14. FIG. 14 depicts a back view of the apparel item 1200, where the back panel 1410 comprises a plurality of reinforcement strips 1412 arranged in a pre-determined pattern. The reinforcement strips 1412 may comprise seam tape, polyurethane or thermoplastic polyurethane tape, memory wire, fabric strips, and the like. As explained above with respect to the apparel item 100, the reinforcement strips 1412 may limit expansion in the area in which they are located and thus may be used to guide the selective inflation of the back panel 1410. The reinforcement strips 1412 may be useful when the apparel item 1200 is formed from a lightweight or ultra-lightweight material as the strips 1412 may help to provide structure to the apparel item 1200. The pattern shown in FIG. 14 is exemplary only, and it is contemplated herein that other configurations may be used to achieve different expansion patterns for the back panel 1410.

Figure 17:
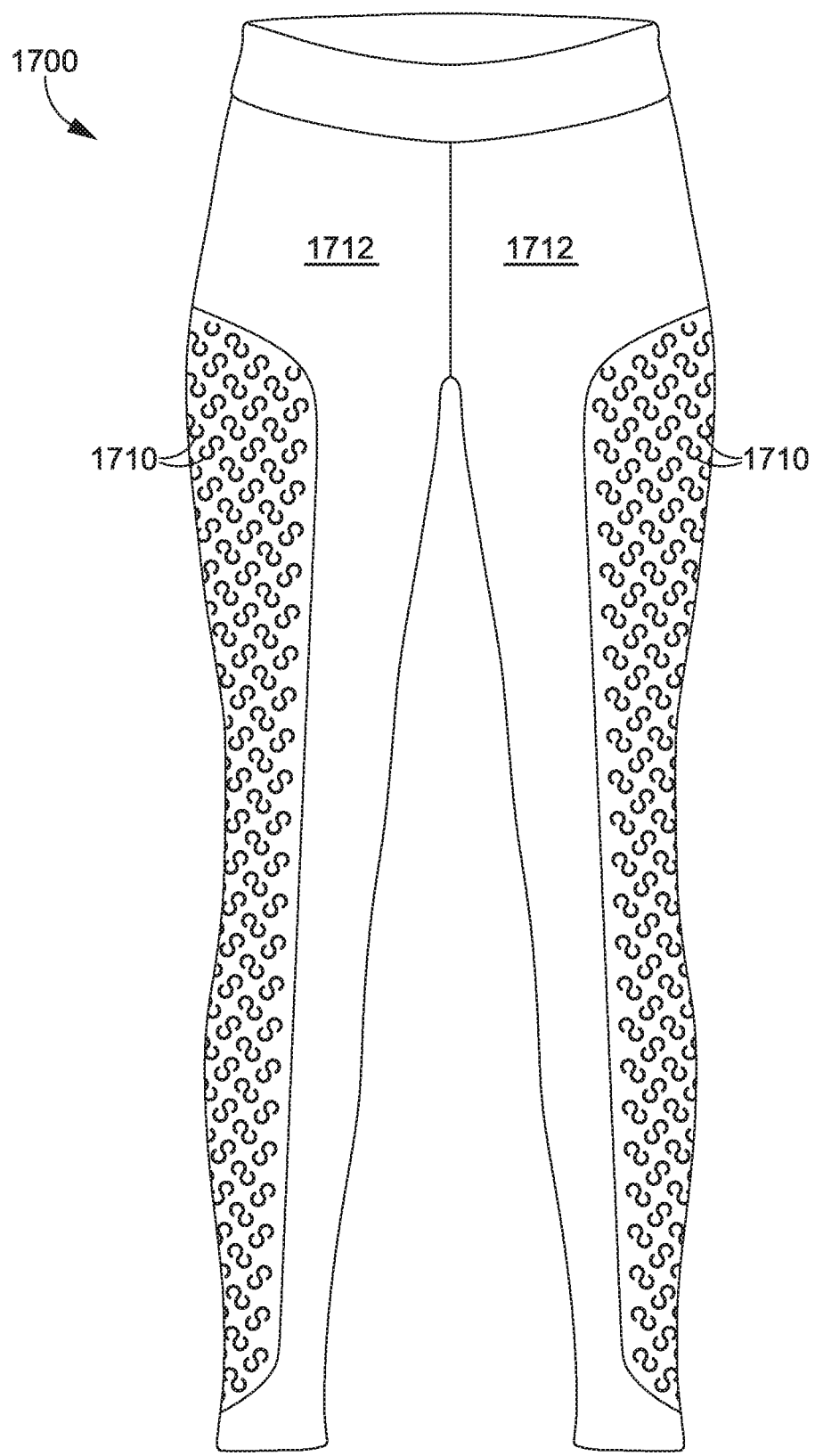
FIG. 17 illustrates a front view of an exemplary pant having an integrated parachute structure in accordance with aspects herein.

Although shown in the form of a jacket, it is contemplated herein, that the apparel item thus described may be in the form of a pant as shown in FIGS. 17-19B and as referenced by the reference numeral 1700. For example, the pant 1700 may be formed of a material that is substantially impermeable to air, and a plurality of S-shaped intake ducts 1710 may be formed through the material of the pant 1700 as shown in FIG. 17 which depicts a front view of the pant 1700. In exemplary aspects, the plurality of intake ducts 1710 may be positioned over an anterior and lateral face of the pant 1700. More particularly, the intake ducts 1710 may be positioned over an anterior and lateral face of a front panel 1712 of the pant 1700. The locations of the intake ducts 1710 are exemplary only and it is contemplated herein that the intake ducts 1710 may be positioned at other areas of the pant 1700.

Figure 18:
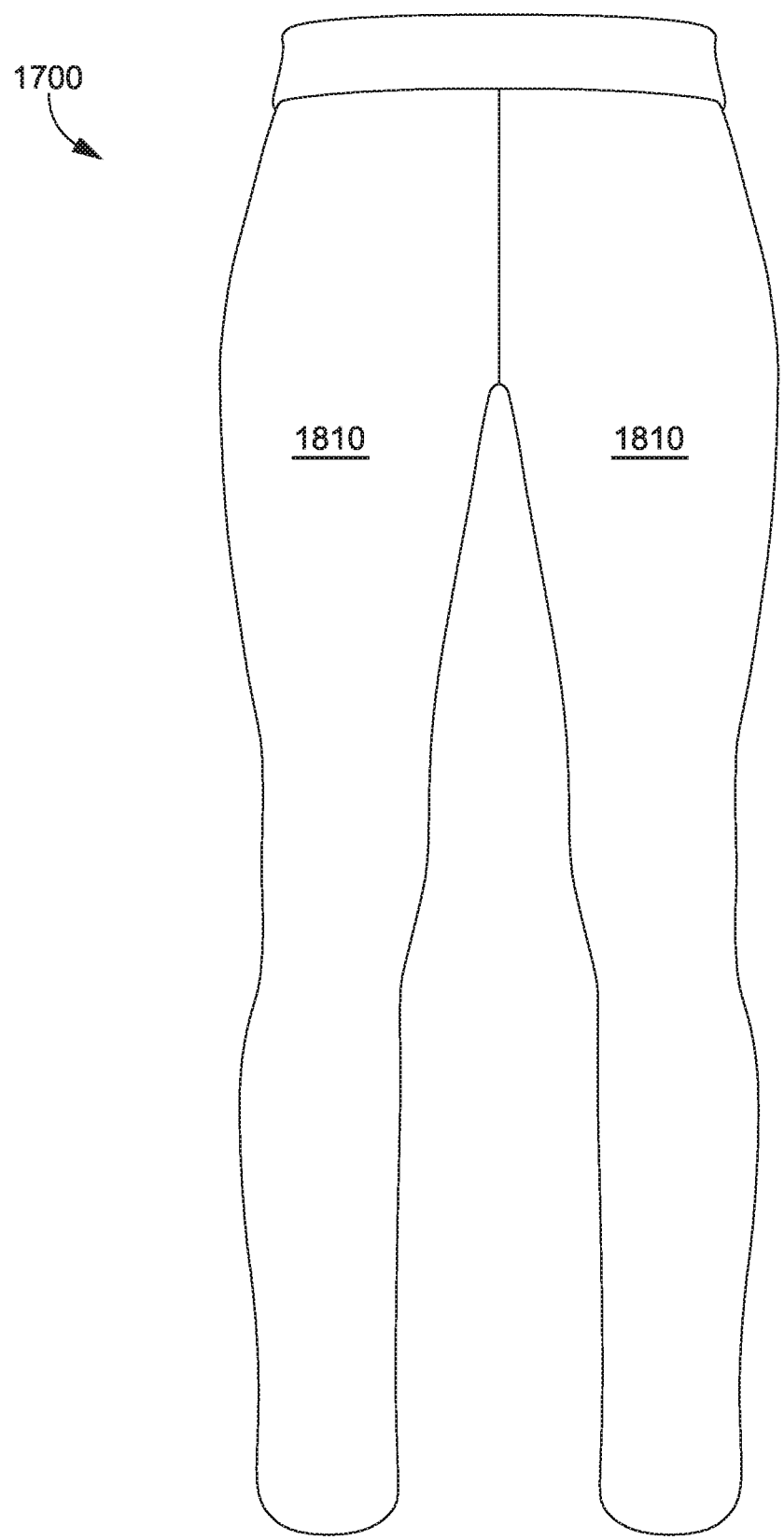
FIG. 18 illustrates a back view of the exemplary pant having the integrated parachute structure of FIG. 17 in accordance with aspects herein.

FIG. 18 depicts a back view of the pant 1700 in accordance with aspects herein. The pant 1700 further comprises a back panel 1810 which may be separate from the front panel 1712 or may be integrally formed with the front panel 1712. The back panel 1810 may be configured to be oversized so that it can serve as a parachute structure. In exemplary aspects, the back panel 1810 is configured to overlay or be positioned adjacent to a back lower torso of a wearer when the pant 1700 is worn. In other words, it is contemplated herein that the back panel 1810 comprises a single layer with no overlying layer.

Figure 19A:
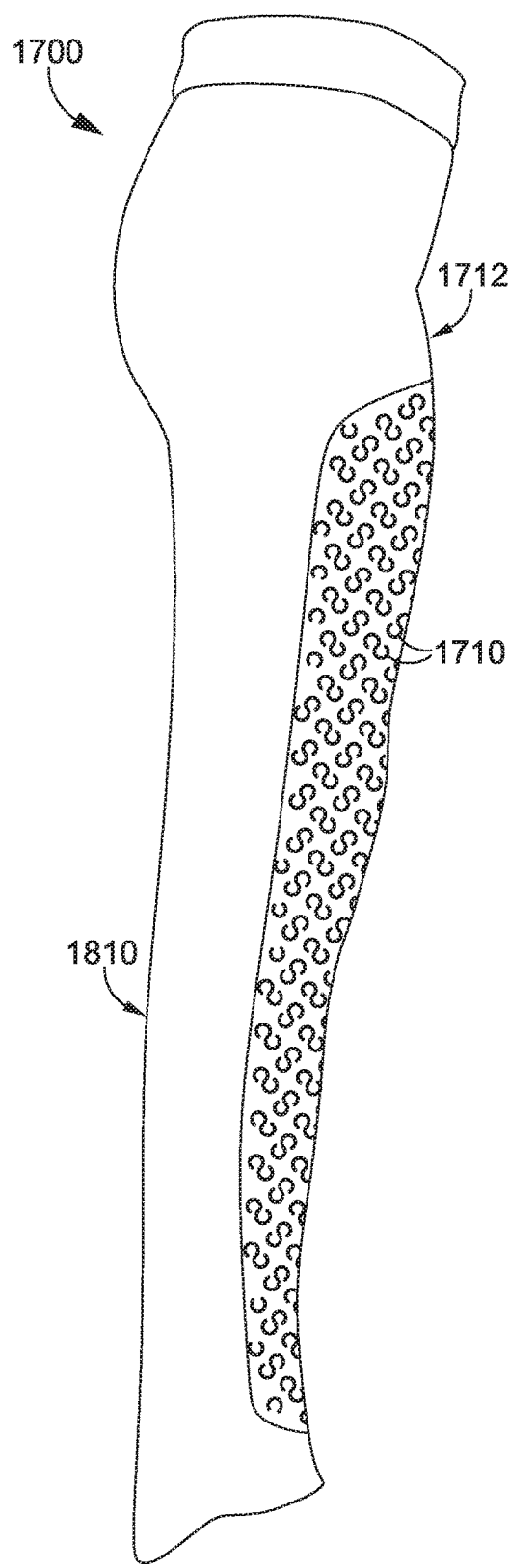
FIG. 19A illustrates a side view of the exemplary pant having the integrated parachute structure of FIG. 17 where the parachute structure is in a slack state in accordance with aspects herein.
Figure 19B:
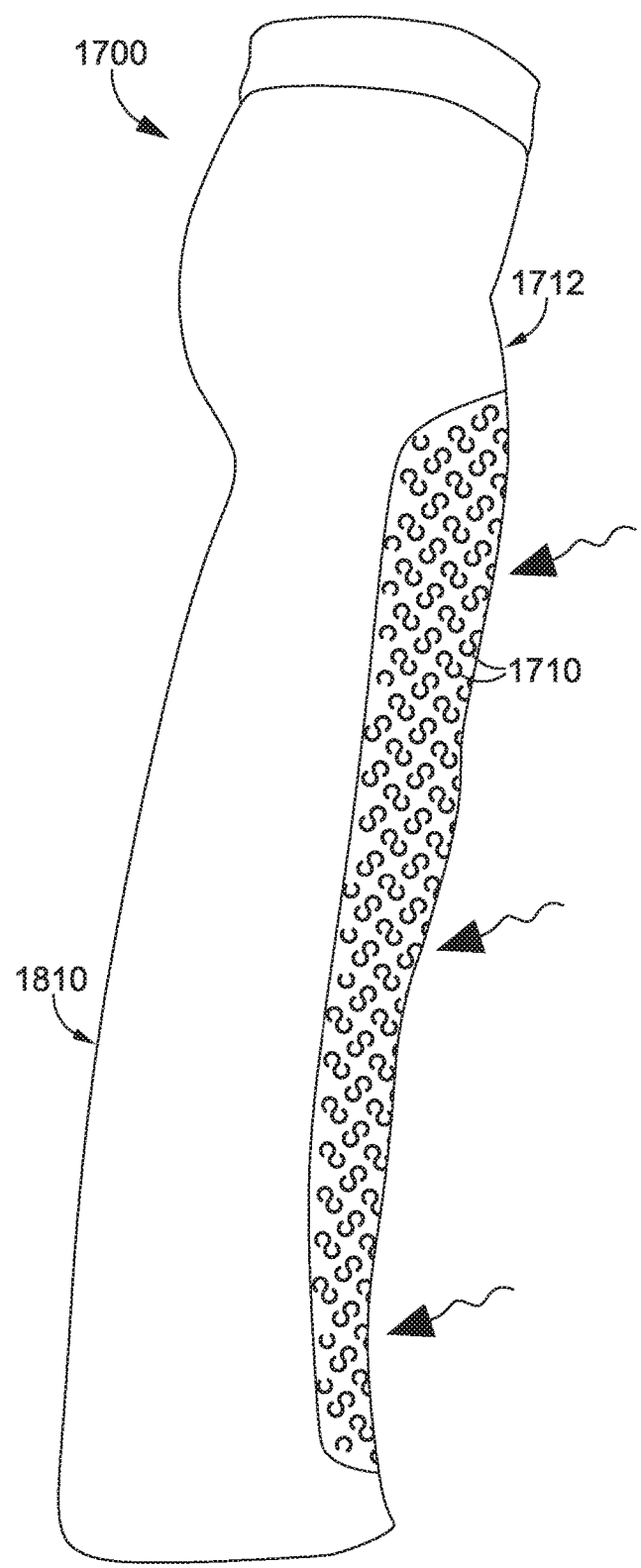
FIG. 19B illustrates a side view of the exemplary pant having the integrated parachute structure of FIG. 17 where the parachute structure is in an inflated state in accordance with aspects herein.

Air entering the intake ducts 1710 incident to a wearer of the pant 1700 initiating ground locomotion may transition the back panel 1810 of the pant 1700 from a slack state to an inflated state. This is shown in FIGS. 19A and 19B which depict right side views of the pant 1700 in accordance with aspects herein. FIG. 19A depicts the back panel 1810 of the pant 1700 in a slack state, and FIG. 19B depicts the back panel 1810 of the pant 1700 in an inflated state initiated upon air (shown by the arrows) entering the intake ducts 1710. Other features described for the apparel item 1200 may be equally applicable to the pant 1700. For instance, the leg openings of the pant 1700 may be configured to closely conform to the wearer's body so as to prevent the inadvertent escape of air and to provide for more rapid and sustained insufflation of the back panel 1810. As well, reinforcement strips may be used to generate specific expansion patterns. Any and all aspects, and any variation thereof, are contemplated as being within the scope herein.

From the foregoing, it will be seen that aspects herein are well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made without departing from the scope thereof, it is to be understood that all matter herein set forth or shown in the accompanying drawings is to be interpreted as illustrative and not in a limiting sense.

What is claimed is:

1. An apparel item comprising:
   at least a front panel and a back panel, wherein:
   the front panel comprises a first plurality of intake ducts, wherein the first plurality of intake ducts comprise flaps created in a material used to form the front panel, wherein the front panel has a thickness and the first plurality of intake ducts are substantially S-shaped openings formed through the thickness of the front panel, creating the flaps of the first plurality of intake ducts, wherein each of the S-shaped openings is divided into two halves by a strip of material left at a mid-point between the two halves, wherein the strip of material serves as a hinge point for the flaps of the first plurality of intake ducts; and
   the back panel is configured to transition from a first slack state to a second inflated state subsequent to air entering the first plurality of intake ducts, wherein the second inflated state increases air resistance to ground locomotion of a wearer.

2. The apparel item of claim 1, wherein the S-shaped openings are positioned in varying orientations on the front panel, such that different ones of the flaps are engaged by different wind flow patterns.

3. The apparel item of claim 1, wherein the first plurality of intake ducts are in fluid communication with a space between an inner-facing surface of the apparel item and a wearer's body when the apparel item is in an as-worn configuration.

4. The apparel item of claim 1, wherein at least one of a material used to form the back panel and the material used to form the front panel is substantially impervious to air.

5. The apparel item of claim 1, further comprising a plurality of reinforcement strips on the back panel.

6. The apparel item of claim 5, wherein the plurality of reinforcement strips are at least one of seam tape, a polyurethane tape, a thermoplastic polyurethane tape, memory wire, and fabric strips.

7. An apparel item comprising:
   at least a front panel and a back panel that is at least partially attached to the front panel, wherein:
   the front panel comprises a first plurality of intake ducts, wherein the first plurality of intake ducts comprise flaps created in a material used to form the front panel, wherein the front panel has a thickness and the first plurality of intake ducts are substantially S-shaped openings formed through the thickness of the front panel, creating the flaps of the first plurality of intake ducts, wherein each of the S-shaped openings is divided into two halves by a strip of material left at a mid-point between the two halves, wherein the strip of material serves as a hinge point for the flaps of the first plurality of intake ducts; and
   the back panel is configured to transition from a first slack state to a second inflated state subsequent to air entering the first plurality of intake ducts, wherein the second inflated state increases air resistance to ground locomotion of a wearer.

8. The apparel item of claim 7, wherein the first plurality of intake ducts are in fluid communication with a space between an inner-facing surface of the apparel item and a wearer's body when the apparel item is in an as-worn configuration.

9. The apparel item of claim 7, wherein at least one of a material used to form the back panel and the material used to form the front panel is substantially impervious to air.

10. The apparel item of claim 7, wherein the S-shaped openings are positioned in varying orientations on the front panel, such that different ones of the flaps are engaged by different wind flow patterns.

11. The apparel item of claim 7, further comprising a plurality of reinforcement strips on the back panel, wherein the plurality of reinforcement strips are at least one of seam tape, a polyurethane tape, a thermoplastic polyurethane tape, memory wire, and fabric strips.

12. An apparel item comprising:
   at least a front panel and a back panel that is at least partially attached to the front panel, wherein the apparel item is formed from a material that is substantially impervious to air, wherein:
   the front panel has a thickness and a first plurality of intake ducts, wherein the first plurality of intake ducts are S-shaped openings formed through the thickness of the front panel, the S-shaped openings creating flaps in the front panel that are pivotal toward and away from the first plurality of intake ducts, wherein each of the S-shaped openings are divided into two halves by a strip of material left at a mid-point between the two halves, wherein the strip of material serves as a hinge point for the flaps;
   wherein the first plurality of intake ducts are in fluid communication with a space between an inner-facing surface of the apparel item and a wearer's body when the apparel item is in an as-worn configuration; and
   the back panel is configured to transition from a first slack state to a second inflated state subsequent to air entering the first plurality of intake ducts, wherein the second inflated state increases air resistance to ground locomotion of a wearer.

13. The apparel item of claim 12, wherein the S-shaped openings are positioned in varying orientations on the front panel, such that different ones of the flaps are engaged by different wind flow patterns.

14. The apparel item of claim 12, further comprising a plurality of reinforcement strips on the back panel, wherein the plurality of reinforcement strips are at least one of seam tape, a polyurethane tape, a thermoplastic polyurethane tape, memory wire, and fabric strips.

* * * * *